United States Patent
Kanemitsu et al.

(10) Patent No.: US 10,145,088 B2
(45) Date of Patent: Dec. 4, 2018

(54) CONTROL SYSTEM OF WORK MACHINE AND WORK MACHINE

(71) Applicant: Komatsu Ltd., Tokyo (JP)

(72) Inventors: Yasuo Kanemitsu, Hiratsuka (JP); Yoshiki Kami, Hadano (JP)

(73) Assignee: Komatsu Ltd., Tokyo (JP)

( * ) Notice: Subject to any disclaimer, the term of this patent is extended or adjusted under 35 U.S.C. 154(b) by 0 days.

(21) Appl. No.: 14/778,724

(22) PCT Filed: May 29, 2015

(86) PCT No.: PCT/JP2015/065637
§ 371 (c)(1),
(2) Date: Sep. 21, 2015

(87) PCT Pub. No.: WO2015/167022
PCT Pub. Date: Nov. 5, 2015

(65) Prior Publication Data
US 2016/0348343 A1 Dec. 1, 2016

(51) Int. Cl.
*E02F 9/26* (2006.01)
*E02F 9/12* (2006.01)
(Continued)

(52) U.S. Cl.
CPC ............ *E02F 9/267* (2013.01); *E02F 9/123* (2013.01); *E02F 9/2025* (2013.01);
(Continued)

(58) Field of Classification Search
None
See application file for complete search history.

(56) References Cited

U.S. PATENT DOCUMENTS

| 4,920,655 A | * | 5/1990 | Van Steenwyk | G01C 21/16 |
| | | | | 33/304 |
| 5,742,915 A | * | 4/1998 | Stafford | G07C 5/008 |
| | | | | 701/32.3 |

(Continued)

FOREIGN PATENT DOCUMENTS

| CN | 1970901 A | 5/2007 |
| CN | 103917717 A | 7/2014 |

(Continued)

OTHER PUBLICATIONS

Stafford, "Inclination Sensors Explained", Sep. 2014, Pepperl + Fuchs, https://blog.pepperl-fuchs.us/blog/bid/352674/Inclination-Sensors-Explained-My-Slant-on-Things (Year: 2014).*

(Continued)

*Primary Examiner* — David P. Merlino
(74) *Attorney, Agent, or Firm* — Locke Lord LLP

(57) ABSTRACT

A control system comprising a position information generation unit configured to operate three modes to output position information:
  a first mode in which information about the position detected by a position detection apparatus is output as position information related to the position of a work machine, when the position determination is normal,
  a second mode in which information about a position obtained by using both of a particular point as a reference of the work machine obtained before a position determination becomes abnormal and operation information detected by a status detection apparatus is output as the position information, when the position determination is abnormal and the work machine is a static status, and (Continued)

a third mode in which the position information is not output, when the position determination is abnormal and the work machine is in a non-static status.

13 Claims, 8 Drawing Sheets

(51) Int. Cl.
    *E02F 9/22*           (2006.01)
    *G01S 19/14*         (2010.01)
    *E02F 9/20*           (2006.01)

(52) U.S. Cl.
    CPC .......... *E02F 9/2292* (2013.01); *E02F 9/2296* (2013.01); *E02F 9/264* (2013.01); *G01S 19/14* (2013.01)

(56) References Cited

U.S. PATENT DOCUMENTS

| | | | | |
|---|---|---|---|---|
| 6,711,838 | B2* | 3/2004 | Staub | E02F 9/26 701/50 |
| 7,831,362 | B2* | 11/2010 | Ishibashi | E02F 9/2045 701/50 |
| 9,422,692 | B2* | 8/2016 | Taylor | E02F 9/264 |
| 2001/0018638 | A1* | 8/2001 | Quincke | A01B 79/005 701/468 |
| 2005/0080559 | A1 | 4/2005 | Ishibashi et al. | |
| 2005/0197755 | A1 | 9/2005 | Knowlton et al. | |
| 2007/0125226 | A1 | 6/2007 | Komiyama et al. | |
| 2010/0299031 | A1* | 11/2010 | Zhdanov | E02F 3/845 701/50 |
| 2014/0222300 | A1* | 8/2014 | Kakela | E02F 9/2296 701/50 |
| 2014/0297040 | A1* | 10/2014 | Baba | E02F 9/2037 700/275 |
| 2014/0300732 | A1* | 10/2014 | Friend | G06T 7/0042 348/135 |
| 2014/0324291 | A1 | 10/2014 | Jones et al. | |
| 2016/0024757 | A1 | 1/2016 | Nomura et al. | |

FOREIGN PATENT DOCUMENTS

| | | |
|---|---|---|
| EP | 2048371 A1 | 4/2009 |
| JP | 2004-125580 A | 4/2004 |
| JP | 2004-212294 A | 7/2004 |
| JP | 2005-267568 A | 9/2005 |
| JP | 2007-147588 A | 6/2007 |
| JP | 2014-205955 A | 10/2014 |
| WO | 2005/043433 A1 | 5/2005 |

OTHER PUBLICATIONS

International Search Report and Written Opinion dated Aug. 11, 2015, issued for PCT/JP2015/065637.
Office Action dated on Sep. 20, 2018 issued for corresponding German Patent Application No. 112015000055.0.

* cited by examiner

CONTROL SYSTEM OF WORK MACHINE AND WORK MACHINE

FIELD

The present invention relates to a control system for a work machine used in the work machine having a work device, and also relates to a work machine.

BACKGROUND

A technique for measuring a three-dimensional position of a work machine by using the GPS (Global Positioning System) and the like, using the obtained position information about the work machine to manage the work machine, manage a construction status performed by the work machine, and control the work machine has been known. Patent Literature 1 describes a technique for accurately measuring the position of a monitor point even when there is a change in the measurement precision of the three-dimensional position of a work machine.

CITATION LIST

Patent Literature

Patent Literature 1:Japanese Patent Application Laid-open No. 2004-125580

SUMMARY

Technical Problem

There is a work machine having equipment for determining the position of the work machine, in which information about the position of the work machine detected by the equipment is used to cause a display apparatus installed in the operator's cabin of the work machine to display a guidance screen of a work, and control operation of the work device. A construction with such work machine is called a computerized construction, but the work machine preferably includes a function for backing up the position determination in a case where the position of the work machine cannot be determined due to some reason, and if there is a function for backing up the position determination, the computerized construction can be appropriately continued.

In the technique described in Patent Literature 1, when there is a decrease in the measurement precision with the three-dimensional position measurement means, the position computation of the monitor point is corrected on the basis of the yaw angle measured by the yaw angle measurement means. However, when, e.g., a correct value of yaw angle cannot be obtained due to operation failure, communication failure, or the like of the yaw angle measurement means, or the work machine is travelling, the position obtained by correcting the computation result may be different from the actual position even if the correction is performed on the basis of the measurement value of the yaw angle measurement means. When the position obtained by correcting the computation result is different from the actual position, and the operation of the work machine is controlled on the basis of the corrected position, the work device may not be controlled appropriately.

In the technique described in Patent Literature 1, the origin point of the coordinate system of the excavator is defined as a cross point of a swing center and a frame of a swing base. Further, in the technique described in Patent Literature 1, when the GPS is not normal, the precisions of both of the GPS antennas will change in response to a change in at least one of the roll angle and the pitch angle, but Patent Literature 1 neither describes nor suggests correction for this change. Therefore, in the technique described in Patent Literature 1, when the GPS is not normal, the work device may not be appropriately controlled.

It is an object of the present invention to provide a control system of a work machine and a work machine for performing computerized construction on the basis of a result obtained by performing position determination of the position of the work machine, wherein while the computerized construction is performed, the control system of the work machine and the work machine are capable of realizing at least one of: continuously controlling the work device in an appropriate manner; and displaying legitimate information on a guidance screen of a work.

Solution to Problem

The present invention provides a control system configured to control a work machine including a work device having a work tool and a travelling apparatus, the control system comprising: a position detection apparatus configured to detect a position of the work machine; a status detection apparatus configured to detect operation information indicating operation of the work machine; a position information generation unit configured to operate in any one of a first mode in which information about the position detected by the position detection apparatus is output as position information related to the position of the work machine, a second mode in which information about a position obtained by using both of a particular point serving as a reference of the work machine obtained before a position determination performed by the position detection apparatus becomes abnormal and the operation information detected by the status detection apparatus is output as the position information, and a third mode in which the position information is not output, wherein when the position determination performed by the position detection apparatus is normal, the position information generation unit operates in the first mode, and when the position determination performed by the position detection apparatus is abnormal and the work machine is static status, the position information generation unit operates in the second mode, and when the position determination performed by the position detection apparatus is abnormal and the work machine is in a non-static status, the position information generation unit operates in the third mode; and a target value generation unit configured to obtain a position of the work device on the basis of the position information obtained from the position information generation unit.

In the present invention, it is preferable that the position information generation unit operates in the third mode in a case where there is an abnormality in at least one of equipment configured to detect operation of the work machine and equipment configured to obtain the position of the work machine during operation in the second mode.

In the present invention, it is preferable that wherein the work machine includes a swing body which is attached with the work device, and which is attached to the travelling apparatus, and which is mounted on the travelling apparatus to swing, the particular point is a cross point of a rotation center axis of the swing body and a surface corresponding to a surface with which the travelling apparatus comes into contact before the position determination performed by the position detection apparatus becomes abnormal, and further, the position information generation unit operates in the first mode in a case where the position determination performed by the position detection apparatus becomes normal during operation of the second mode, and the position information generation unit operates in the third mode on condition that the work machine travels during operation in the second mode.

In the present invention, it is preferable that instead of the condition, the position information generation unit operates in the third mode on condition that there is an abnormality in at least one of the equipment configured to detect operation of the work machine and the equipment configured to obtain the position of the work machine.

The present invention provides a control system configured to control a work machine including a travelling apparatus, a work device having a work tool, and a swing body which is attached with the work device and which is mounted on the travelling apparatus to swing, the control system comprising: a position detection apparatus configured to detect a position of the work machine; a status detection apparatus configured to detect operation of the work machine and detect operation information indicating the detected operation; a position information generation unit configured to operate in any one of a first mode in which information about the position detected by the position detection apparatus is output as position information related to the position of the work machine, a second mode in which information about a position obtained by using both of a particular point serving as a reference of the work machine obtained before a position determination performed by the position detection apparatus becomes abnormal and the operation information detected by the status detection apparatus is output as the position information, and a third mode in which the position information is not output, wherein when the position determination performed by the position detection apparatus is normal during operation in the second mode, the position information generation unit operates in the first mode, and the position information generation unit operates in the third mode on condition that the work machine becomes a non-static status during operation in the second mode; a target value generation unit configured to obtain a position of the work device on the basis of the position information obtained from the position information generation unit.

In the present invention, it is preferable that in a case where the position determination performed by the position detection apparatus becomes normal during operation in the second mode while the swing body is swinging, the position information generation unit continues operation in the second mode until at least swinging of the swing body is finished.

In the present invention, it is preferable that instead of the condition, the position information generation unit operates in the third mode on condition that there is an abnormality in at least one of the equipment configured to detect operation of the work machine and the equipment configured to obtain the position of the work machine during operation in the second mode.

In the present invention, it is preferable that instead of the condition, the position information generation unit operates in the third mode on condition that a time of operation in the second mode is more than a threshold value.

In the present invention, it is preferable that instead of the condition, the position information generation unit does not output the position of the work machine on condition that the swing body swings an angle larger than a particular angle in a same direction during operation in the second mode.

The present invention provides a control system configured to control a work machine including a travelling apparatus, a work device having a work tool, and a swing body which is attached with the work device and which is mounted on the travelling apparatus to swing, the control system comprising: a position detection apparatus configured to detect a position of the work machine; a status detection apparatus configured to detect operation of the work machine and detect operation information indicating the detected operation; a position information generation unit configured to operate upon selecting from any one of, by using a status of a position determination performed by the position detection apparatus and a status of the work machine, a first mode in which information about the position detected by the position detection apparatus is output as position information related to the position of the work machine, a second mode in which information about a position obtained by using both of a particular point which serves as a reference of the work machine obtained before the position determination performed by the position detection apparatus becomes abnormal and which is a cross point of a rotation center axis of the swing body and a surface corresponding to a surface with which the travelling apparatus comes into contact and the operation information detected by the status detection apparatus is output as the position information, and a third mode in which the position information is not output, a target value generation unit configured to obtain a position of the work device on the basis of the position information obtained from the position information generation unit.

In the present invention, it is preferable that in a case where the work machine is in a static status and the position determination performed by the position detection apparatus is normal, the position information generation unit operates in the first mode, and obtains the particular point, and when the work machine becomes a non-static status or the position determination performed by the position detection apparatus becomes abnormal, the position information generation unit operates in the second mode by using the particular point.

In the present invention, it is preferable that the position information generation unit determines the non-static status in a case where an operation device configured to operate the swing body is ON or in a case where an operation device configured to operate the travelling apparatus is ON or in a case where a status continues for a first period of time in which a speed at which the swing body swings is equal to or more than a threshold value, and the position information generation unit determines the static status in a case where an operation device configured to operate the swing body is OFF or in a case where an operation device configured to operate the travelling apparatus is OFF or in a case where a status continues for a second period of time in which a speed at which the swing body swings is less than a threshold value.

The present invention provides a work machine including the control system for the work machine.

The present invention is capable of providing a control system of a work machine and a work machine for performing computerized construction on the basis of a result obtained by performing position determination of the position of the work machine, wherein while the computerized construction is performed, the control system of the work machine and the work machine are capable of realizing at least one of: continuously controlling the work device in an appropriate manner; and displaying legitimate information on a guidance screen of a work.

DESCRIPTION OF EMBODIMENTS

A mode for carrying out the present invention (embodiment) will be explained in details with reference to drawings.

<Overall configuration of work machine>

Figure 1:
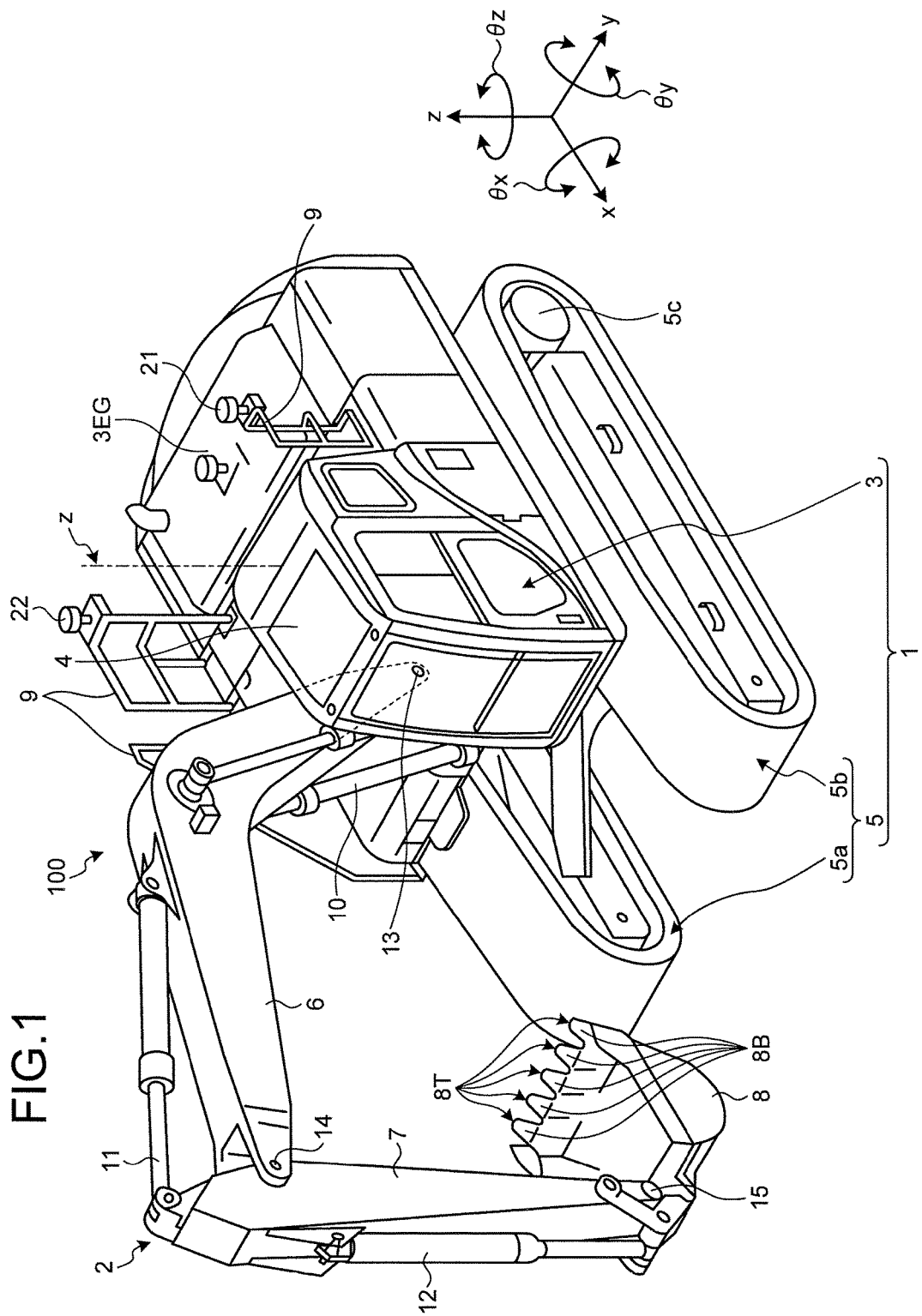
FIG. 1 is a perspective view illustrating a work machine according to an embodiment.
Figure 2:
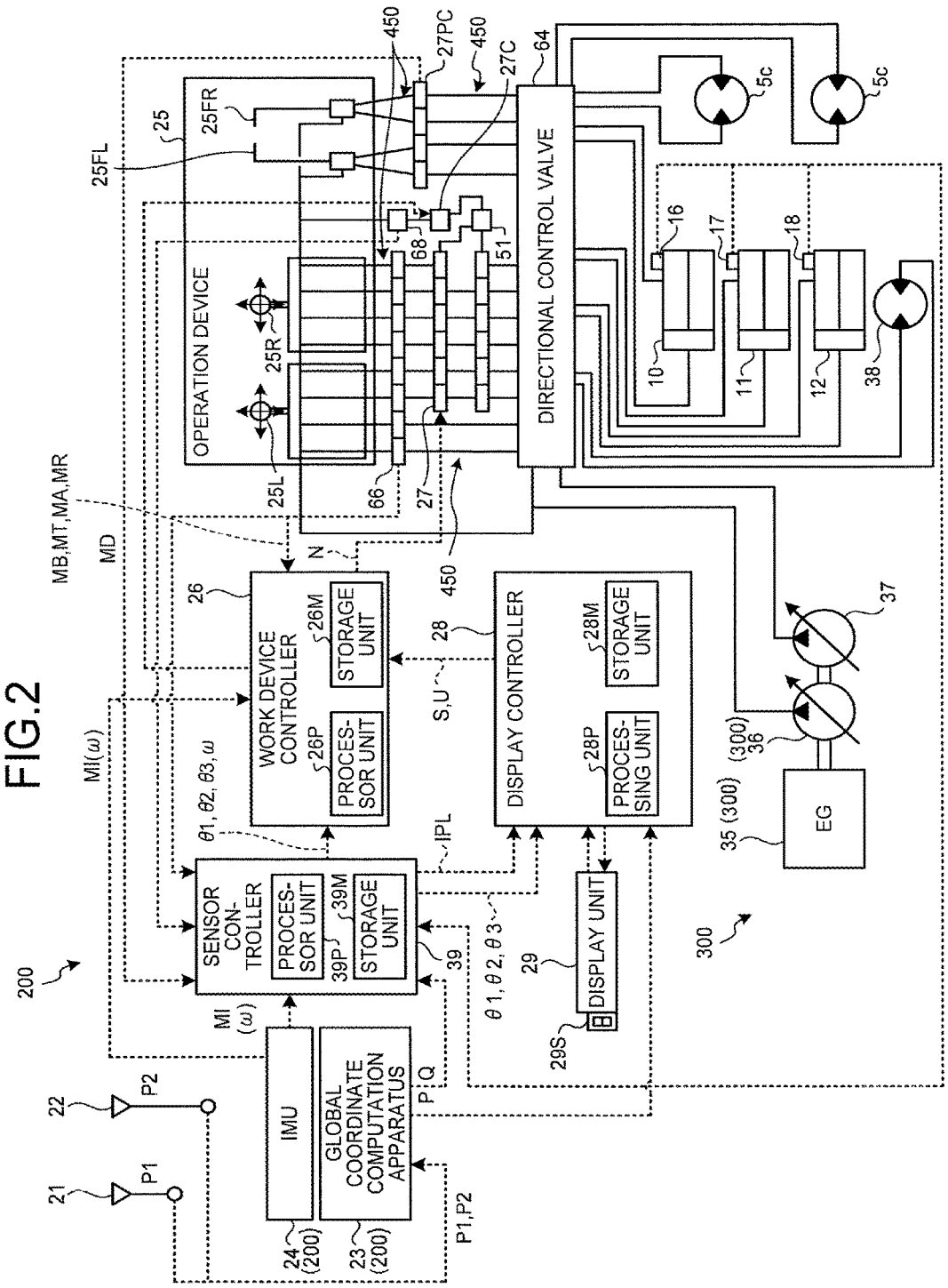
FIG. 2 is a block diagram illustrating a configuration of a control system and a hydraulic system of an excavator.

FIG. 1 is a perspective view of a work machine according to an embodiment. FIG. 2 is a block diagram illustrating a configuration of a control system 200 and a hydraulic system 300 of an excavator 100. The excavator 100 serving as a work machine includes a vehicle main body 1 serving as a main body unit and a work device 2. The vehicle main body 1 includes an upper swing body 3 serving as a swing body and a travelling apparatus 5 serving as a travelling body. The upper swing body 3 includes apparatuses such as an engine and a hydraulic pump, which are motive power generation apparatuses, provided in an engine room 3EG.

In the embodiment, the excavator 100 uses an internal-combustion engine such as, for example, a diesel engine, as the engine of the motive power generation apparatus, but the motive power generation apparatus is not limited to the internal-combustion engine. The motive power generation apparatus of the excavator 100 may be, for example, a so-called hybrid-method apparatus which is a combination of an internal-combustion engine, a generator motor and electric motor, and an electric power accumulation apparatus. The motive power generation apparatus of the excavator 100 may not have any internal-combustion engine, and may be an apparatus of a combination of an electric power accumulation apparatus and a generator motor and electric motor.

The upper swing body 3 has an operator's cabin 4. The operator's cabin 4 is placed at the other end side of the upper swing body 3. More specifically, the operator's cabin 4 is provided at a side opposite to the side where the machine room 3EG is arranged. A display unit 29 and an operation device 25, shown in FIG. 2, are arranged in the operator's cabin 4. Above the upper swing body 3, a handrails 9 are attached.

On the travelling apparatus 5, the upper swing body 3 is mounted. The travelling apparatus 5 includes crawler belts 5a, 5b. The travelling apparatus 5 is driven by one or both of hydraulic motors 5c provided at the right and left. When the crawler belts 5a, 5b of the travelling apparatus 5 rotate, the excavator 100 is caused to move. The work device 2 is arranged at a side of the operator's cabin 4 of the upper swing body 3.

The excavator 100 may have tires instead of the crawler belts 5a, 5b, and may have a travelling apparatus capable of transmitting driving force of an engine to the tires via a transmission. An example of the excavator 100 in such mode includes a wheel-type excavator.

In the upper swing body 3, a side where the work device 2 and the operator's cabin 4 are provided is the front, and a side where the machine room 3EG is provided is the rear. The longitudinal direction of the upper swing body 3 is the x direction. When facing the front, the left hand side is the left of the upper swing body 3, and when facing the front, the right hand side is the right of the upper swing body 3. The right/left direction of the upper swing body 3 is also referred to as a width direction or the y direction. The excavator 100 or the vehicle main body 1 is such that the side of the travelling apparatus 5 with respect to the upper swing body 3 is the bottom, and the side of the upper swing body 3 with respect to the travelling apparatus 5 is the top. The upper/lower direction of the upper swing body 3 is the z direction. When the excavator 100 is placed on a horizontal plane, the lower side is the vertical direction, i.e., the direction in which the gravity is exerted, and the upper side is the side opposite to the vertical direction.

The work device 2 includes a boom 6, an arm 7, a bucket 8 which is a work tool, a boom cylinder 10, an arm cylinder 11, and a bucket cylinder 12. The proximal end portion of the boom 6 is swingably attached to the front portion of the vehicle main body 1 via a boom pin 13. The proximal end portion of the arm 7 is swingably attached to the distal end portion of the boom 6 via an arm pin 14. The bucket 8 is attached to the distal end portion of the arm 7 via a bucket pin 15. The bucket 8 rotates about the bucket pin 15. The bucket 8 is attached with multiple blades 8B at the side opposite to the bucket pin 15. A blade end 8T is the end of the blade 8B.

The bucket 8 may not include the multiple blades 8B. More specifically, the bucket 8 may not include the blades 8B as shown in FIG. 1, and may be a bucket in which the blade end is formed in a straight form with a steel plate. The work device 2 may be provided with, for example, a tilt bucket having a single blade. The tilt bucket includes a bucket tilt cylinder, and is a bucket that tilts and inclines to the right and the left, whereby the excavator 100 can form a slope surface and a flat ground into any free shape and level the ground even if it is an inclined ground, so that the bucket can perform a surface compaction work with a bottom plate. In addition, instead of the bucket 8, the work device 2 may include, as a work tool, a slope finishing bucket, a rock drilling attachment having a rock drilling tip, or the like.

The boom cylinder 10, the arm cylinder 11, and the bucket cylinder 12 as shown in FIG. 1 are hydraulic cylinders respectively driven by pressures of operation oils. Hereinafter, the pressures of operation oils may be referred to as hydraulic as necessary. The boom cylinder 10 drives the boom 6, and raises or lowers this. The arm cylinder 11 drives the arm 7, and rotates the arm 7 around the arm pin 14. The bucket cylinder 12 drives the bucket 8, and rotates the bucket 8 around the bucket pin 15.

A directional control valve 64 as shown in FIG. 2 is provided between the hydraulic cylinder such as the boom cylinder 10, the arm cylinder 11, and the bucket cylinder 12, and hydraulic pumps 36, 37 as shown in FIG. 2. The directional control valve 64 controls the flow rate of the operation oil provided from the hydraulic pumps 36, 37 to the boom cylinder 10, the arm cylinder 11, the bucket cylinder 12, and the like, and switches the direction in which the operation oil flows. The directional control valve 64 includes a travelling directional control valve for driving the hydraulic motor 5c, and a work device directional control valve for controlling the boom cylinder 10, the arm cylinder 11, and the bucket cylinder 12, and further controlling a swing motor 38 for swinging the upper swing body 3.

When the spool of the directional control valve 64 is operated by the operation oil provided from an operation device 25 and adjusted to have a predetermined pilot pressure force, the flow rate of the operation oil flowing out from the directional control valve 64 is adjusted, thus controlling the flow rate of the operation oil provided from the hydraulic pumps 36, 37 to the boom cylinder 10, the arm cylinder 11, the bucket cylinder 12, the swing motor 38, or the hydraulic motor 5c. As a result, the operation of the boom cylinder 10, the arm cylinder 11, the bucket cylinder 12, and the like are controlled.

When a work device controller 26 as shown in FIG. 2 controls a control valve 27 as shown in FIG. 2, the pilot pressure of the operation oil provided from the operation device 25 to the directional control valve 64 is controlled, thus controlling the flow rate of the operation oil provided from the directional control valve 64 to the boom cylinder 10, the arm cylinder 11, the bucket cylinder 12, or the swing motor 38. As a result, the work device controller 26 can control the operation of the boom cylinder 10, the arm cylinder 11, the bucket cylinder 12, and the upper swing body 3.

Antennas 21, 22 are attached to the upper side of the upper swing body 3. The antennas 21, 22 are used to detect the current position of the excavator 100. The antennas 21, 22 are electrically connected to a global coordinate computation apparatus 23 as shown in FIG. 2. The global coordinate computation apparatus 23 is a position detection apparatus for detecting the position of the excavator 100. The global coordinate computation apparatus 23 uses RTK-GNSS (Real Time Kinematic-Global Navigation Satellite Systems, GNSS means Global Navigation Satellite Systems) to detect the current position of the excavator 100. In the following explanation, the antennas 21, 22 will be referred to as GNSS antennas 21, 22 as necessary. Signals according to the GNSS radio waves received by the GNSS antennas 21, 22 are input into the global coordinate computation apparatus 23. The global coordinate computation apparatus 23 derives the installation positions of the GNSS antennas 21, 22 in the global coordinate system. An example of Global Navigation Satellite System includes GPS (Global Positioning System), but the Global Navigation Satellite System is not limited thereto.

As shown in FIG. 1, the GNSS antennas 21, 22 are preferably installed on the upper swing body 3 in the right/left direction of the excavator 100, i.e., preferably installed at both end positions which are away from each other in the width direction. In the embodiment, the GNSS antennas 21, 22 are attached to the handrails 9 respectively attached to both sides in the width direction of the upper swing body 3. The positions where the GNSS antennas 21, 22 are attached to the upper swing body 3 are not limited to the handrails 9, but the GNSS antennas 21, 22 are preferably installed at positions as far as possible in order to improve the detection precision of the current position of the excavator 100. The GNSS antennas 21, 22 are preferably installed at positions where the visual field of the operator is not obstructed as much as possible. Therefore, for example, the GNSS antennas 21, 22 may be installed on a counterweight provided at the rear of the machine room 3EG.

As shown in FIG. 2, the hydraulic system 300 of the excavator 100 includes an engine 35 and the hydraulic pumps 36, 37. The hydraulic pumps 36, 37 are driven by the engine 35, and discharge the operation oils. The operation oil discharged from the hydraulic pumps 36, 37 are provided to the boom cylinder 10, the arm cylinder 11, and the bucket cylinder 12. The excavator 100 includes the swing motor 38. The swing motor 38 is a hydraulic motor, and is driven by the operation oils discharged from the hydraulic pumps 36, 37. The swing motor 38 swings the upper swing body 3. In FIG. 2, the two hydraulic pumps 36, 37 are shown, but there may be only a single hydraulic pump. The swing motor 38 is not limited to the hydraulic motor, and may be an electric motor.

The control system 200 which is the control system of the work machine includes the global coordinate computation apparatus 23, an IMU (Inertial Measurement Unit: inertial measurement apparatus) 24 which is a status detection apparatus for detecting the angular velocity and the acceleration, the operation device 25, the work device controller 26 serving as a work device control unit, a sensor controller 39 serving as a position information generation unit, a display controller 28 serving as a target value generation unit, and the display unit 29. The operation device 25 is an apparatus for operating at least one of the work device 2, the upper swing body 3, and the travelling apparatus 5 as shown in FIG. 1. The operation device 25 receives an operation performed by an operator to drive the work device 2 and the like, and outputs a pilot hydraulic in accordance with the amount of operation.

The operation device 25 includes a left operation lever 25L installed at the left hand side of the operator and a right operation lever 25R provided at the right hand side of the operator. With the left operation lever 25L and the right operation lever 25R, an operation in the front and the back and to the right and the left is associated with two-axis operation. For example, an operation of the right operation lever 25R in the longitudinal direction is associated with an operation of the boom 6. An operation of the right operation lever 25R in the right/left direction is associated with an operation of the bucket 8. The operation of the left operation lever 25L in the longitudinal direction is associated with an operation of the arm 7. An operation of the left operation lever 25L in the right/left direction is associated with a swing of the upper swing body 3.

In the embodiment, the operation device 25 uses a pilot hydraulic method. The operation oil of which pressure is reduced to a predetermined pilot pressure force by a pressure-reducing valve, not shown, is provided to the operation device 25 from the hydraulic pump 36, on the basis of boom operation, bucket operation, arm operation, swing operation, and travelling operation.

In accordance with an operation of the right operation lever 25R in the longitudinal direction, the pilot hydraulic is enabled to be provided to a pilot oil passage 450, so that the operation of the boom 6 by the operator is received. In accordance with the amount of operation of the right operation lever 25R, the valve device provided in the right operation lever 25R is opened, and the operation oil is provided to the pilot oil passage 450. A pressure sensor 66 detects, as the pilot pressure, the pressure of the operation oil in the pilot oil passage 450 at that moment. The pressure sensor 66 transmits the detected pilot pressure to the work device controller 26 as a boom operation signal MB.

A pressure sensor 68, a control valve (which will be hereinafter referred to as an intervention valve as necessary) 27C, and a shuttle valve 51 are provided in the pilot oil passage 450 between the operation device 25 and the boom cylinder 10. In accordance with the operation of the right operation lever 25R in the right/left direction, the pilot hydraulic is enabled to be provided to the pilot oil passage 450, so that the operation of the bucket 8 by the operator is received. In accordance with the amount of operation of the right operation lever 25R, the valve device provided in the right operation lever 25R is opened, and the operation oil is provided to the pilot oil passage 450. The pressure sensor 66 detects, as the pilot pressure, the pressure of the operation oil in the pilot oil passage 450 at that moment. The pressure sensor 66 transmits the detected pilot pressure to the work device controller 26 as a bucket operation signal MT.

In accordance with the operation of the left operation lever 25L in the longitudinal direction, the pilot hydraulic is enabled to be provided to the pilot oil passage 450, so that the operation of the arm 7 by the operator is received. In accordance with the amount of operation of the left operation lever 25L, the valve device provided in the left operation lever 25L is opened, and the operation oil is provided to the pilot oil passage 450. The pressure sensor 66 detects, as the pilot pressure, the pressure of the operation oil in the pilot oil passage 450 at that moment. The pressure sensor 66 transmits the detected pilot pressure to the work device controller 26 as an arm operation signal MA.

In accordance with the operation of the left operation lever 25L in the right/left direction, the pilot hydraulic is enabled to be provided to the pilot oil passage 450, so that the swing operation of the upper swing body 3 by the operator is received. In accordance with the amount of operation of the left operation lever 25L, the valve device provided in the left operation lever 25L is opened, and the operation oil is provided to the pilot oil passage 450. The pressure sensor 66 detects, as the pilot pressure, the pressure of the operation oil in the pilot oil passage 450 at that moment. The pressure sensor 66 transmits the detected pilot pressure to the work device controller 26 as a swing operation signal MR.

When the right operation lever 25R is operated, the operation device 25 provides a pilot hydraulic of a size according to the amount of operation of the right operation lever 25R to the directional control valve 64. When the left operation lever 25L is operated, the operation device 25 provides a pilot hydraulic of a size according to the amount of operation of the left operation lever 25L to the control valve 27. With this pilot hydraulic, the spool of the directional control valve 64 moves.

The pilot oil passage 450 is provided with the control valve 27. The amounts of operations of the right operation lever 25R and the left operation lever 25L are detected by the pressure sensor 66 installed in the pilot oil passage 450. The pilot hydraulic detected by the pressure sensor 66 is input into the work device controller 26. The work device controller 26 outputs, to the control valve 27, a control signal N of the pilot oil passage 450 according to the input pilot hydraulic, thereby opening and closing the pilot oil passage 450.

The operation device 25 includes travelling levers 25FL, 25FR. In the embodiment, the operation device 25 uses the pilot hydraulic method, and therefore, the pressure-reduced operation oil is provided from the hydraulic pump 36 to the directional control valve 64, and the spool of the directional control valve 64 is driven on the basis of the pressure of the operation oil in the pilot oil passage 450. Then, the operation oil is provided from the hydraulic pumps 36, 37 to the hydraulic motors 5c, 5c provided in the travelling apparatus 5 of the excavator 100, enabling the excavator 100 to travel. The pressure of the operation oil in the pilot oil passage 450, i.e., the pilot pressure, is detected by a pressure sensor 27PC.

In a case where the operator of the excavator 100 operates the travelling apparatus 5, the operator operates the travelling levers 25FL, 25FR. The amounts of operations of the travelling levers 25FL, 25FR by the operator are detected by the pressure sensor 27PC, and are output to the work device controller 26 as an operation signal MD.

The amounts of operations of the left operation lever 25L and the right operation lever 25R are detected by, for example, a potentiometer, a hole IC, and the like, and the work device controller 26 may control the work device 2 by controlling the directional control valve 64 and the control valve 27 on the basis of these detection values. As described above, the left operation lever 25L and the right operation lever 25R may be in an electric method.

The control system 200 includes a first stroke sensor 16, a second stroke sensor 17, and a third stroke sensor 18. For example, the first stroke sensor 16 is provided on the boom cylinder 10, the second stroke sensor 17 is provided on the arm cylinder 11, the third stroke sensor 18 is provided on the bucket cylinder 12. The first stroke sensor 16 detects the amount of displacement corresponding to an extension of the boom cylinder 10, and outputs the amount of displacement corresponding to an extension of the boom cylinder 10 to the sensor controller 39. The second stroke sensor 17 detects the amount of displacement corresponding to an extension of the arm cylinder 11, and outputs the amount of displacement corresponding to an extension of the arm cylinder 11 to the sensor controller 39. The third stroke sensor 18 detects the amount of displacement corresponding to an extension of the bucket cylinder 12, and outputs the amount of displacement corresponding to an extension of the bucket cylinder 12 to the sensor controller 39.

The work device controller 26 includes a processor unit 26P which is a processor such as a CPU (Central Processing Unit) and a storage unit 26M which is a storage device such as a RAM (Random Access Memory) and a ROM (Read Only Memory). The work device controller 26 controls the control valve 27 and the intervention valve 27C on the basis of the detection value of the pressure sensor 66 as shown in FIG. 2.

The directional control valve 64 as shown in FIG. 2 is, for example, a proportional control valve, and is controlled by the operation oil provided from the operation device 25. The directional control valve 64 is provided between the hydraulic pumps 36, 37 and the hydraulic actuators such as the boom cylinder 10, the arm cylinder 11, the bucket cylinder 12, and the swing motor 38. The directional control valve 64 controls the flow rates of the operation oils provided from the hydraulic pumps 36, 37 to the boom cylinder 10, the arm cylinder 11, the bucket cylinder 12, and the swing motor 38.

The GNSS antenna 21 receives reference position data P1 indicating the position of itself from position determination satellites. The GNSS antenna 22 receives reference position data P2 indicating the position of itself from position determination satellites. The GNSS antennas 21, 22 receive the reference position data P1, P2 with a predetermined cycle. The reference position data P1, P2 are information about the positions where the GNSS antennas are installed. The signals according to the GNSS radio waves received by the GNSS antennas 21, 22 are input into the global coordinate computation apparatus 23. Every time the GNSS antennas 21, 22 receive the reference position data P1, P2, the GNSS antennas 21, 22 output the reference position data P1, P2 to the global coordinate computation apparatus 23.

The global coordinate computation apparatus 23 obtains two reference position data P1, P2 (multiple reference position data) indicated by the global coordinate system. The global coordinate computation apparatus 23 generates swing body arrangement data indicating the arrangement of the upper swing body 3 on the basis of the two reference position data P1, P2. In the embodiment, the swing body arrangement data include reference position data P of at least one of the two reference position data P1, P2 and swing body azimuth data Q generated on the basis of the two reference position data P1, P2. A GPS compass may be constituted by the two GNSS antennas 21, 22 to obtain the swing body azimuth data Q. More specifically, the reference position data of both of the GNSS antennas 21, 22 are not output, and instead, the azimuth angle is calculated from the relative positions of the two GNSS antennas, and the azimuth angle may be adopted as the swing body azimuth data Q.

In the embodiment, the swing body azimuth data Q is an angle formed by the azimuth determined from the reference position data P obtained by the GNSS antennas 21, 22 with respect to the reference azimuth of the global coordinate (for example, north), and more specifically, the swing body azimuth data Q is an azimuth angle. The azimuth angle is also an yaw angle of the excavator 100. The swing body azimuth data Q indicates the azimuth in which the upper swing body 3 is oriented, and more specifically, the swing body azimuth data Q indicates the azimuth in which the work device 2 is oriented.

The global coordinate computation apparatus 23 includes a processor unit which is a processor such as a CPU and a storage unit that is a storage device such as a RAM and a ROM. The global coordinate computation apparatus 23 obtains the two reference position data P1, P2 from the GNSS antennas 21, 22 with a predetermined cycle. The global coordinate computation apparatus 23 derives the azimuth angle of the excavator 100 which is the swing body azimuth data Q, i.e., the azimuth angle of the upper swing body 3, from the obtained two reference position data P1, P2. Every time the global coordinate computation apparatus 23 obtains the two reference position data P1, P2, the global coordinate computation apparatus 23 updates the swing body arrangement data, i.e., the reference position data P and the swing body azimuth data Q, and outputs the swing body arrangement data to the sensor controller 39.

The display controller 28 includes a processor unit 28P which is a processor such as a CPU, and a storage unit 28M which is a storage device such as a RAM (Random Access Memory) and a ROM. The display controller 28 not only causes the display unit 29 to display an image such as, e.g., a guidance screen explained later, but also uses position information IPL about the excavator 100 obtained from the sensor controller 39 to generate bucket blade end position data S indicating the blade end position which is a three-dimensional position of the blade end 8T of the bucket 8. The display unit 29 is, for example, a liquid crystal display apparatus and the like, but is not limited thereto. The display unit 29 may be, for example, a touch panel made by integrating an input unit and a display unit. In the embodiment, a switch 29S is provided adjacently to the display unit 29. The switch 29S is an input device for executing an excavation control explained later and stopping an excavation control that is being executed. When a touch panel is used for the display unit 29, the switch 29S may be incorporated into the input unit of the touch panel.

The display controller 28 can cause the display unit 29 to display, as a guidance screen, an image of a target construction surface which the work device 2 excavates and an image of the bucket 8 generated using the bucket blade end position data S. On the guidance screen, the display controller 28 allows the operator of the excavator 100 to recognize the position relationship of the target construction surface and the bucket 8, and reduce the burden imposed on the operator when the computerized construction is performed.

The IMU 24 is a status detection apparatus for detecting the operation information MI indicating the operation of the excavator 100. The operation of the excavator 100 includes at least one of the operation of the upper swing body 3 and the operation of the travelling apparatus 5. In the embodiment, the operation information MI may include information indicating the posture of the excavator 100. The information indicated by the posture of the excavator 100 indicates, for example, the roll angle, the pitch angle, and the azimuth angle of the excavator 100.

In the embodiment, the IMU 24 detects the angular velocity and the acceleration of the excavator 100. In accordance with the operation of the excavator 100, various accelerations such as an acceleration generated during travelling and an angle acceleration and a gravity acceleration generated during swinging occur with the excavator 100, but the IMU 24 detects an acceleration including at least the gravity acceleration, and outputs the detected acceleration without distinguishing the type of each acceleration. In this case, the gravity acceleration is an acceleration corresponding to a resisting force against the gravity. The IMU 24 detects the acceleration in the x axis direction, the y axis direction, and the z axis direction in the local coordinate system (x, y, z) as shown in FIG. 1, and the angular velocity around the x axis, the y axis, and the z axis (rotation angular velocity). These are the operation information MI. The local coordinate system is a three-dimensional coordinate system in which the excavator 100 is the reference, and the three-dimensional coordinate system is indicated as (x, y, z).

The operation information MI detected by the IMU 24 includes the rotation angular velocity at which the upper swing body 3 swings about the z axis which is the rotation center axis of the upper swing body 3, and more specifically, the operation information MI detected by the IMU 24 includes a swing angular velocity ω. The swing angular velocity ω may be derived by differentiating the swing angle of the upper swing body 3, obtained from the information indicating the positions of the GNSS antennas 21, 22, with respect to the time. When the swing angular velocity ω is differentiated with respect to the time, the swing angle can be derived.

The IMU 24 is attached to the upper swing body 3. The IMU 24 is preferably provided on, e.g., the swing center axis of the upper swing body 3 of the excavator 100 in order to detect the acceleration and the like with a higher degree of precision, but the IMU 24 may also be installed under the operator's cabin 4.

The sensor controller 39 includes a processor unit 39P which is a processor such as a CPU (Central Processing Unit) and a storage unit 39M which is a storage device such as a RAM (Random Access Memory) and a ROM (Read Only Memory). The sensor controller 39 receives the detection value of the global coordinate computation apparatus 23, the detection value of the IMU 24, the detection values of the pressure sensors 27PC, 66, 68, the detection value of the first stroke sensor 16, the detection value of the second stroke sensor 17, and the detection value of the third stroke sensor 18. The sensor controller 39 derives the position information IPL related to the position of the excavator 100 from the detection value of the global coordinate computation apparatus 23 and the detection value of the IMU 24, and outputs the position information IPL to the display controller 28 and the work device controller 26.

Figure 3:
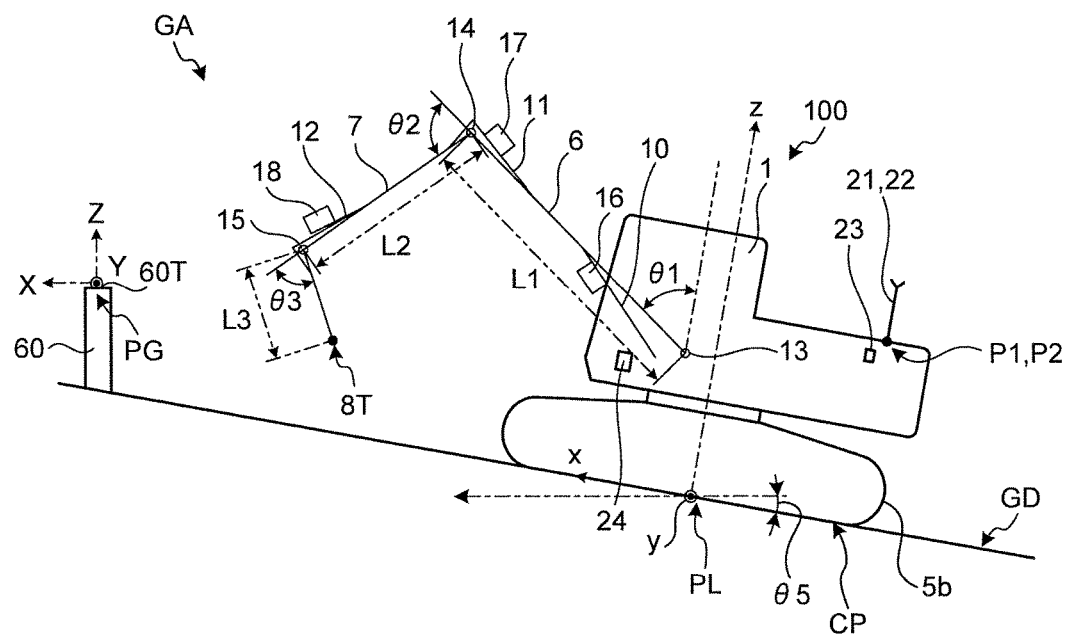
FIG. 3 is a side view of the excavator.
Figure 4:
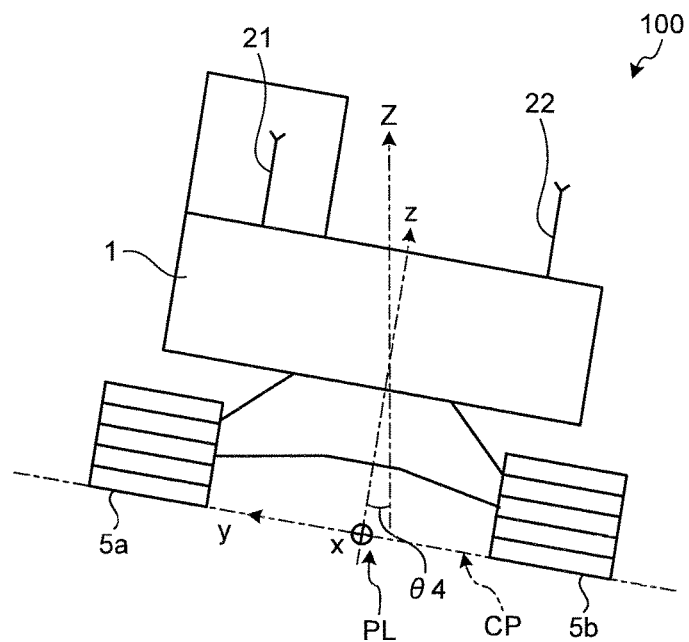
FIG. 4 is a back view of the excavator.

FIG. 3 is a side view illustrating the excavator 100. FIG. 4 is a back view illustrating the excavator 100. The right/left direction of the vehicle main body 1, i.e., an inclination angle $\theta 4$ with respect to the width direction, is the roll angle of the excavator 100, and an inclination angle $\theta 5$ of the vehicle main body 1 with respect to the longitudinal direction is the pitch angle of the excavator 100, and the angle of the upper swing body 3 around the z axis is the azimuth angle of the excavator 100. The roll angle can be derived by integrating the angular velocity about the x axis detected by the IMU 24 with respect to the time. The pitch angle can be derived by integrating the angular velocity about the y axis detected by the IMU 24 with respect to the time. The azimuth angle can be derived by integrating the angular velocity about the z axis detected by the IMU 24 with respect to the time. The angular velocity about the z axis is the swing angular velocity $\omega$ of the excavator 100. More specifically, by integrating the swing angular velocity $\omega$ with respect to the time, the azimuth angle of the excavator 100 can be obtained, and more specifically, the azimuth angle of the upper swing body 3 can be obtained.

The IMU 24 updates the acceleration and the angular velocity of the excavator 100 with a predetermined cycle. The update cycle of the IMU 24 is preferably shorter than the update cycle of the global coordinate computation apparatus 23. The acceleration and the angular velocity detected by the IMU 24 are output, as the operation information MI, to the sensor controller 39 or the work device controller 26. The sensor controller 39 applies processing such as filter processing and integration to the operation information MI obtained from the IMU 24, and derives an inclination angle $\theta 4$ which is the roll angle, an inclination angle $\theta 5$ which is the pitch angle, and the azimuth angle. The sensor controller 39 outputs the inclination angle $\theta 4$, the inclination angle $\theta 5$, and the azimuth angle, which have been derived, to the display controller 28 as the position information IPL related to the position of the excavator 100.

The display controller 28 obtains the reference position data P and the swing azimuth data Q from the global coordinate computation apparatus 23. The swing azimuth data Q is information indicating the azimuth of the excavator 100, and in the embodiment, the swing azimuth data Q is information indicating the azimuth of the upper swing body 3. More specifically, the swing azimuth data Q is the azimuth angle of the upper swing body 3. In the embodiment, the display controller 28 generates the bucket blade end position data S as the work device position data. The bucket blade end position data S may be generated by the sensor controller 39 or the work device controller 26. Then, the display controller 28 uses the bucket blade end position data S and target construction information T to generate target excavation topographical data U indicating the target shape which is to be excavated. The target construction information T is stored in the storage unit 28M of the display controller 28 (target construction information storage unit 28C). The target construction information T is information about finish that is realized after the target of excavation has been excavated by the work device 2 provided in the excavator 100, and includes information about the target construction surface obtained from the design data. Where a cross point of a target construction surface and a perpendicular line passing through the blade end position of the blade end 8T at the current point in time in the local coordinate system is defined as an excavation target position, the target excavation topographical data U is information about the positions of one or more infection points before and after the excavation target position, and angle information about the line before and after the excavation target position.

The sensor controller 39 calculates an inclination angle $\theta 1$ of the boom 6 (see FIG. 3) in a direction (z axis direction) perpendicular to the horizontal plane in the local coordinate system from the boom cylinder length detected by the first stroke sensor 16. The sensor controller 39 calculates an inclination angle $\theta 2$ of the arm 7 (see FIG. 3) with respect to with respect to the boom 6 from the arm cylinder length detected by the second stroke sensor 17. The sensor controller 39 calculates an inclination angle $\theta 3$ of the bucket 8 with respect to the arm 7 from the bucket cylinder length detected by the third stroke sensor 18. The sensor controller 39 outputs the calculated inclination angles $\theta 1, \theta 2, \theta 3$ to the work device controller 26. The IMU 24 outputs the swing angular velocity $\omega$ to the work device controller 26.

As described above, the work device controller 26 obtains, from the IMU 24, the swing angular velocity $\omega$ of the upper swing body 3 when the upper swing body 3 swings about the z axis as shown in FIG. 1. The work device controller 26 obtains a boom operation signal MB, a bucket operation signal MT, an arm operation signal MA, and a swing operation signal MR from the pressure sensor 66. Further, the work device controller 26 obtains the inclination angle $\theta 1$ about the boom 6, the inclination angle $\eta 2$ about the arm 7, and the inclination angle $\theta 3$ about the bucket 8 from the sensor controller 39.

The work device controller 26 obtains target excavation topographical data U from the display controller 28. The work device controller 26 calculates the position of the blade end 8T of the bucket 8 (which will be hereinafter referred to as a blade end position as necessary) from the angles ($\theta 1, \theta 2, \theta 3$) of the work device 2 obtained from the sensor controller 39. The storage unit 26M of the work device controller 26 stores data of the work device 2 (which will be hereinafter referred to as a work device data as necessary). The work device data includes design dimension about a length L1 of the boom 6, a length L2 of the arm 7, and a length L3 of the bucket 8. As shown in FIG. 3, the length L1 of the boom 6 corresponds to a length from the boom pin 13 to the arm pin 14. The length L2 of the arm 7 corresponds to a length from the arm pin 14 to the bucket pin 15. The length L3 of the bucket 8 corresponds to a length from the bucket pin 15 to the blade end 8T of the bucket 8. The blade end 8T is an end of the blade 8B as shown in FIG. 1. The work device data include information about the position to the boom pin 13 with respect to the origin point position PL of the local coordinate system. The work device controller 26 can derive the blade end position with respect to the origin point position PL by using the lengths L1, L2, L3, the inclination angles $\theta 1, \theta 2, \theta 3$, and the origin point positions PL.

The work device controller 26 adjusts the boom operation signal MB, the bucket operation signal MT, and the arm operation signal MA received from the operation device 25 on the basis of the distance of the target excavation topographical data U and the blade end 8T of the bucket 8 and the speed of the blade end 8T of the bucket 8, so that the blade end 8T of the bucket 8 moves along the target excavation topographical data U. The work device controller 26 generates a control signal N for controlling the work device 2 so that the blade end 8T of the bucket 8 moves along the target excavation topographical data U, and outputs the control signal N to the control valve 27 as shown in FIG. 2. With such processing, the speed at which the work device 2 approaches the target excavation topographical data U is limited in accordance with the distance to the target excavation topographical data U.

The two control valves 27 provided for each of the boom cylinder 10, the arm cylinder 11, and the bucket cylinder 12 are opened and closed in accordance with the control signal N from the work device controller 26. The spool of the directional control valve 64 is operated on the basis of the operation of the left operation lever 25L or the right operation lever 25R and the open and close command of the control valve 27, whereby the operation oil is provided to the boom cylinder 10, the arm cylinder 11, and the bucket cylinder 12.

The global coordinate computation apparatus 23 detects the reference position data P1, P2 of the GNSS antennas 21, 22 in the global coordinate system. The global coordinate system is a three-dimensional coordinate system indicated by (X, Y, Z) in which, e.g., a reference position PG of a reference stake 60, which serves as the reference installed to the work area GA of the excavator 100, is adopted as the reference. As shown in FIG. 3, for example, the reference position PG is located at an end 60T of the reference stake 60 installed in the work area GA. In the embodiment, the global coordinate system is, for example, the coordinate system in the GNSS.

The display controller 28 shown in FIG. 2 calculates the position of the local coordinate system in the global coordinate system on the basis of a detection result of the global coordinate computation apparatus 23. In the embodiment, for example, the origin point position PL of the local coordinate system is a cross point of the z axis, which is the rotation center axis of the swing body, and a surface corresponding to the surface with which the travelling apparatus 5 comes into contact. In the embodiment, the coordinate of the origin point position PL is (0, 0, 0) in the local coordinate system. The surface with which the travelling apparatus 5 comes into contact is a surface GD of the work area GA with which the crawler belts 5a, 5b come into contact. The surface corresponding to the surface with which the travelling apparatus 5 comes into contact may be the surface GD of the work area GA, or may be a plane CP defined by a portion with which the crawler belts 5a, 5b come into contact. The plane CP defined by the portion with which the crawler belts 5a, 5b come into contact is uniquely determined from the design dimension of the excavator 100 in the local coordinate system (x, y, z).

The origin point position PL is not limited to the cross point of the z axis and the plane CP. In the embodiment, the position of a quasi-fixed point explained later may match the origin point position PL, or may not match the origin point position PL. The origin point position PL of the local coordinate system may be another location, and, for example, the center point of the length of the boom pin 13 in the axis direction may be adopted as the origin point position PL. The origin point position PL may be located on the z axis and on a swing circle in which the upper swing body 3 swings. As described above, the work device controller 26 derives the blade end position with respect to the origin point position PL, and more specifically, the work device controller 26 derives the blade end position in the local coordinate system, and therefore, as long as the coordinate of the origin point position PL in the global coordinate system can be obtained, the coordinate of the blade end position in the local coordinate system can be converted into the coordinate of the blade end position in the global coordinate system.

The work device controller 26 performs control so that the speed in the direction in which the work device 2 approaches the excavation target becomes equal to or less than the limit speed so as to suppress abrasion of the target excavation topography by the bucket 8. This control will be referred to as an excavation control as necessary. The excavation control is a control for making the speed in the direction in which the work device 2 approaches the excavation target to be equal to or less than the limit speed while calculating the relative position of the work device 2 and the excavation target on the basis of the bucket blade end position data S and the target excavation topographical data U obtained from the display controller 28. By executing such control, the excavation target can be made into the target shape (the shape indicated by target construction information T). Subsequently, the control system 200 will be explained in more details.

<Control System 200>

Figure 5:
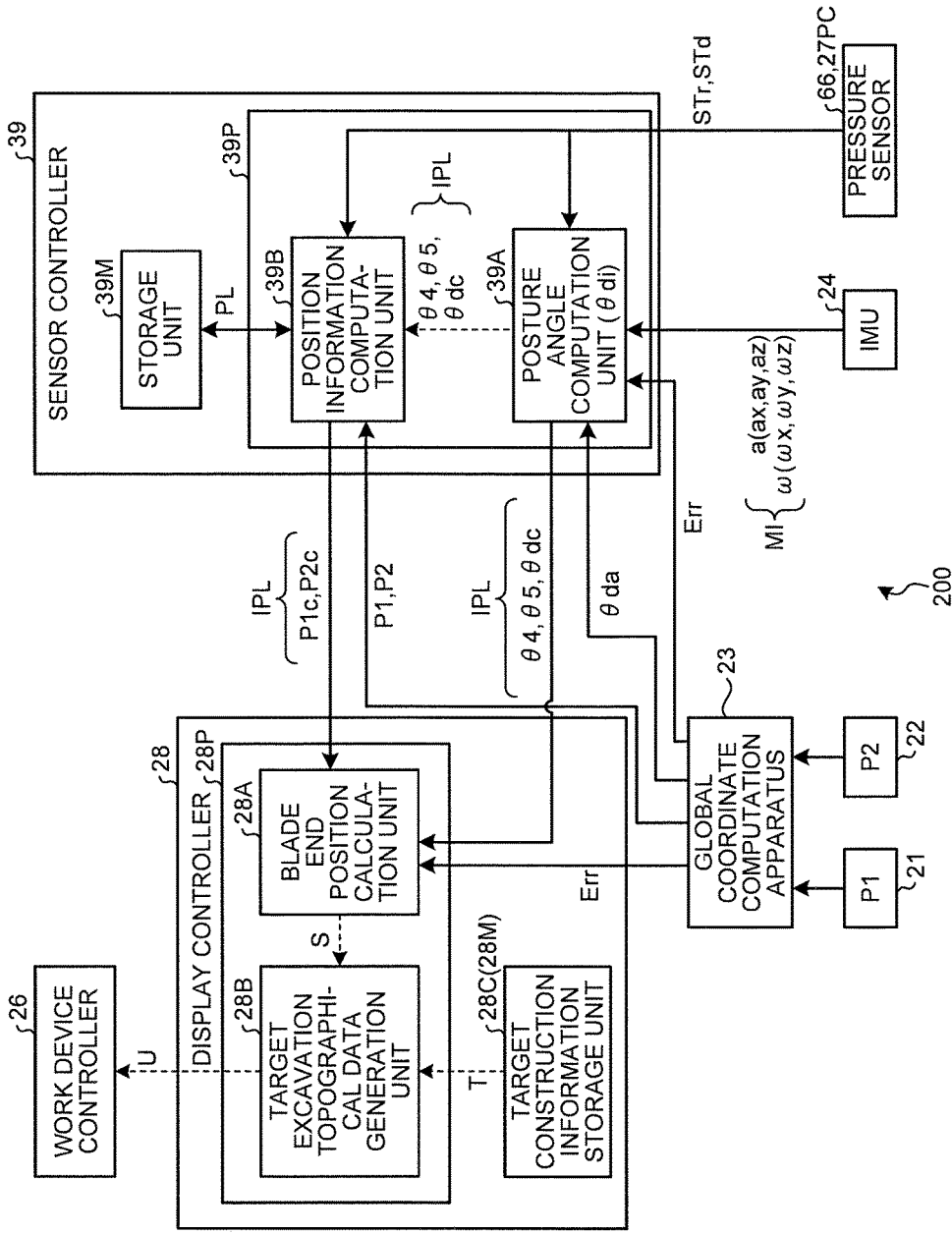
FIG. 5 is a control block diagram of a control system according to an embodiment.
Figure 6:
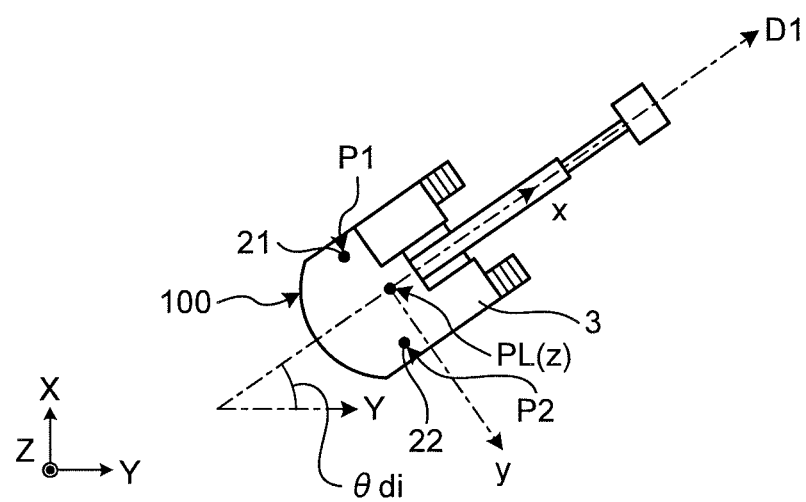
FIG. 6 is a top view illustrating a posture of the excavator.
Figure 7:
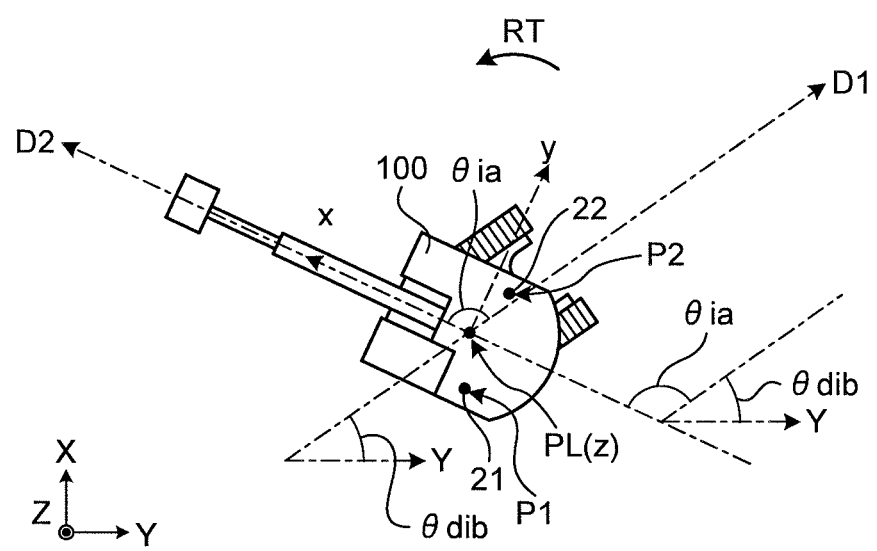
FIG. 7 is a top view illustrating a posture of the excavator.

FIG. 5 is a control block diagram of a control system 200 according to an embodiment. FIGS. 6 and 7 are top views illustrating the posture of the excavator 100. In the embodiment, the work device controller 26, the display controller 28, and the sensor controller 39 in the control system 200 can exchange information with each other via a signal line. The sensor controller 39 can obtain information from the global coordinate computation apparatus 23 via a signal line. An example of a signal line for transmitting information in the control system 200 includes a signal line in a vehicle such as a CAN (Controller Area Network). In the embodiment, in the control system 200, the work device controller 26 and the display controller 28 are separate devices. However, both of the work device controller 26 and the display controller 28 may be realized by a single apparatus.

The display controller 28 includes a blade end position calculation unit 28A, a target excavation topographical data generation unit 28B, and a target construction information storage unit 28C. The blade end position calculation unit 28A and the target excavation topographical data generation unit 28B are realized by causing the processor unit 28P to execute a computer program stored in the storage unit 28M. The target construction information storage unit 28C is realized by a part of the storage area of the storage unit 28M.

The blade end position calculation unit 28A generates swing center position data XR which indicates the position of the swing center of the excavator 100 and passes through the z axis serving as the swing center axis of the upper swing body 3 on the basis of the position information IPL obtained from the sensor controller 39. The position information IPL which the blade end position calculation unit 28A obtains from the sensor controller 39 is the reference position data P1c, P2c based on the reference position data P1, P2 and the azimuth angle θd. The blade end position calculation unit 28A generates the bucket blade end position data S indicating the current position of the blade end 8T of the bucket 8 on the basis of the swing center position data XR, the inclination angles θ1, θ2, θ3 of the work device 2, the length L1 of the boom 6, the length L2 of the arm 7, and the length L3 of the bucket 8, and outputs the bucket blade end position data S to the target excavation topographical data generation unit 28B. The bucket blade end position data S is information indicating the position of the work device 2. In the embodiment, the position of the work device 2 is not limited to the blade end position, i.e., the three-dimensional position of the blade end 8T of the bucket 8, and may be the position of a particular portion of the work device 2. For example, the position of the work device 2 may be the position of a posterior part of the bucket 8, or may be the positon of a bottom part of a slope finishing bucket, or may be the position of a portion where the attachment of the work device 2 is attached.

The target excavation topographical data generation unit 28B obtains the target construction information T stored to the target construction information storage unit 28C and the bucket blade end position data S given from the blade end position calculation unit 28A. The target excavation topographical data generation unit 28B sets, as an excavation target position, a cross point of the target construction surface and a perpendicular line passing through the blade end position of the blade end 8T at the current point in time in the local coordinate system. The target excavation topographical data generation unit 28B generates the target excavation topographical data U on the basis of the target construction information T and the bucket blade end position data S, and outputs the target excavation topographical data U to the work device controller 26.

The processor unit 39P of the sensor controller 39 includes a posture angle computation unit 39A and a position information computation unit 39B. The posture angle computation unit 39A and the position information computation unit 39B are realized by causing the processor unit 39P to execute the computer program stored in the storage unit 39M. The posture angle computation unit 39A receives the acceleration a (ax, ay, az) and the angular velocity ω (ωx, ωy, ωz), which are the detection values of the IMU 24, and more specifically, the posture angle computation unit 39A receives the operation information MI, and the swing body azimuth data Q (azimuth angle θda) which is the detection value of the global coordinate computation apparatus 23. The posture angle computation unit 39A and the position information computation unit 39B in the processor unit 39P receive the detection values of the pressure sensors 66, 27PC.

The global coordinate computation apparatus 23 generates error information Err in a case where the global coordinate computation apparatus 23 cannot receive any radio wave or in a case where there is a failure in communication with the sensor controller 39, and outputs the error information Err to the processor unit 39P of the sensor controller 39 and the processor unit 28P of the display controller 28. More specifically, the global coordinate computation apparatus 23 is a position determination status determination device for determining whether there is a problem in the position determination with RTK-GNSS. When the sensor controller 39 obtains the error information Err, the sensor controller 39 executes processing for backing up the position determination with RTK-GNSS. This processing will be explained later. When the display controller 28 obtains the error information Err, the display controller 28 causes the display unit 29 shown in FIG. 2 to display a message indicating that there is an abnormality in the position determination with RTK-GNSS.

The posture angle computation unit 39A derives the inclination angle θ4, which is the roll angle of the excavator 100, and the inclination angle θ5, which is the pitch angle of the excavator 100, from the detection values of the IMU 24, and outputs the inclination angle θ4 and the inclination angle θ5 to the position information computation unit 39B and the blade end position calculation unit 28A of the display controller 28. The posture angle computation unit 39A derives the azimuth angle θdi by integrating the swing angular velocity ω around the z axis detected by the IMU 24.

The posture angle computation unit 39A switches the azimuth angle θdi derived by the posture angle computation unit 39A or the azimuth angle θda obtained from the global coordinate computation apparatus 23 in accordance with the status of the global coordinate computation apparatus 23 which is the position detection apparatus, and outputs the azimuth angle θdi or the azimuth angle θda to the blade end position calculation unit 28A of the display controller 28 or the position information computation unit 39B as the azimuth angle θdc. More specifically, in a case where the position determination with RTK-GNSS is normal, bucket blade end data S is derived by using the azimuth angle θda obtained from the global coordinate computation apparatus 23, and in a case where the position determination with RTK-GNSS is abnormal, the bucket blade end data S is derived by using the azimuth angle θdi derived by integrating the swing angular velocity ω about the z axis detected by the IMU 24. The inclination angle θ4, the inclination angle θ5, and the azimuth angle θdc sent from the posture angle computation unit 39A to the display controller 28 are the position information IPL related to the position of the excavator 100. In the following explanation, the inclination angle θ4 may be referred to as a roll angle θ4 as necessary, and the inclination angle θ5 may be referred to as a pitch angle θ5 as necessary.

In the embodiment, as described above, the position information IPL is information related to the position of the excavator 100 which is the work machine. The position information IPL includes not only information about the position of the excavator 100 itself but also information required to derive the position of the excavator 100. An example of information about the position of the excavator 100 itself includes the reference position data P1, P2 and the bucket blade end position data S, and an example of information required to derive the position of the excavator 100 includes the inclination angle θ4, the inclination angle θ5, and the azimuth angle θd (θdi, θda or θdc).

The position information computation unit 39B switches the reference position data P1, P2 obtained from the global coordinate computation apparatus 23 and the reference position data P1*i*, P2*i* derived by the position information computation unit 39B, and outputs the reference position data P1, P2 or the reference position data P1*i*, P2*i* to the blade end position calculation unit 28A of the display controller 28 as the reference position data P1*c*, P2*c*. The reference position data P1*i*, P2*i* is information about the position derived by the position information computation unit 39B by using both of the origin point position PL before the status of the global coordinate computation apparatus 23 becomes abnormal and the operation information MI detected by the IMU 24.

The reference position data P1*i*, P2*i* are derived as follows. The reference position data P1*i*, P2*i* are derived from the acceleration a (ax, ay, az) and angular velocity ω (ωx, ωy, ωz) which are the detection values of the IMU 24 by using the roll angle θ4 and pitch angle θ5 derived by the posture angle computation unit 39A and the azimuth angle θdc output from the posture angle computation unit 39A. This azimuth angle θdc is the azimuth angle θda obtained by the posture angle computation unit 39A from the global coordinate computation apparatus 23 before the status of the global coordinate computation apparatus 23 becomes abnormal, or an azimuth angle obtained by adding an azimuth angle obtained through integration of the swing angular velocity ω to the azimuth angle θda.

When the sensor controller 39 outputs the position information IPL about the excavator 100 to the display controller 28, the sensor controller 39 operates in any one of the three modes including the first mode, the second mode, and the third mode. The first mode is a mode in which the sensor controller 39 outputs information about the position detected by the global coordinate computation apparatus 23 as the position information IPL about the excavator 100. The second mode is a mode in which the sensor controller 39 outputs, as the position information IPL, information about the position derived by using both of the origin point position PL of the excavator 100 obtained before the position determination performed by the global coordinate computation apparatus 23 becomes abnormal and the operation information MI detected by the IMU 24. The third mode is a mode in which the sensor controller 39 does not output the position information IPL. The posture angle computation unit 39A and the position information computation unit 39B, i.e., the processor unit 39P, determines the static status of the excavator 100 on the basis of the detection values given by the pressure sensors 66, 27PC, and executes any one of the first mode, the second mode, and the third mode on the basis of the determination result.

The sensor controller 39 operates in the first mode in a case where the position determination performed by the global coordinate computation apparatus 23 is normal. The sensor controller 39 operates in the second mode in a case where the position determination performed by the global coordinate computation apparatus 23 is abnormal and the excavator 100 is not travelling and is at a stop. The sensor controller 39 operates in the third mode in a case where the position determination performed by the global coordinate computation apparatus 23 is abnormal and the excavator 100 is travelling. In the second mode, "the excavator 100 is not travelling and is at a stop" includes not only a status in which the upper swing body 3 is at a stop after swinging, but also a status in which the upper swing body 3 is at a stop without swinging. In the embodiment, the static status is a status in which the excavator 100 is not travelling and the upper swing body 3 is at a stop after swinging or a status in which the upper swing body 3 is at a stop without swinging. In the embodiment, the non-static status is a status in which the excavator 100 is travelling. The case where the position determination performed by the global coordinate computation apparatus 23 is abnormal includes a case where the coordinate values of the reference position data P1, P2 output from the global coordinate computation apparatus 23 indicate abnormal values, a case where a communication error occurs between the global coordinate computation apparatus 23 and the sensor controller 39, and a case where a problem occurs in the position determination with RTK-GNSS. When the GNSS antennas 21, 22 cannot receive the radio wave from position determination satellites or have difficulty in receiving the radio wave, a problem occurs in the position determination with RTK-GNSS.

The control system 200 of the excavator 100 determines the absolute position with RTK-GNSS, and in the embodiment, the control system 200 of the excavator 100 performs position determination to determine the position in the global coordinate. Therefore, in a case where a problem occurs in the position determination with RTK-GNSS because of some reason, and more specifically, in a case where the position determination performed by the global coordinate computation apparatus 23 becomes abnormal, the position determination precision of the absolute position is reduced. If the problem in the position determination with RTK-GNSS lasts only for a short period of time, the position determination with RTK-GNSS can be backed up in accordance with a method other than the position determination with RTK-GNSS. The control system 200 backs up the position determination with RTK-GNSS by using the quasi-fixed point explained later. The control system 200 executes back up of the position determination, so that even when the problem occurs in the position determination with RTK-GNSS, the control system 200 can continue the excavation control and the display of the guidance screen, and can appropriately continue the computerized construction.

When there is a fixed point of which absolute position does not change during the work of the excavator 100 exists in the excavator 100, the control system 200 holds the absolute position of the fixed point, and adds the relative position from the fixed point to any given point of the vehicle main body 1, and therefore, even when a problem occurs in the position determination with RTK-GNSS, and the position determination with RTK-GNSS cannot be realized, the absolute position of any given point of the excavator 100 can be calculated. In reality, as long as the engine EG35 of the excavator 100 is operating, vibration is generated by the operation and the like of the work device 2, and therefore, since there is no fixed point, an approximate position that can be deemed as a fixed point is selected as a quasi-fixed point, and the control system 200 treats the selected quasi-fixed point in the same manner as the fixed point explained above, so that the position determination with RTK-GNSS can be backed up by using the quasi-fixed point. The quasi-fixed point can be deemed as the fixed point in a case where the excavator 100 is not moving, and more specifically, the quasi-fixed point can be deemed as the fixed point in a case where the crawler belts 5a, 5b as shown in FIG. 1 are not moving.

Subsequently, the quasi-fixed point will be explained. In the embodiment, the quasi-fixed point is the origin point position PL of the excavator 100 as shown in FIGS. 3 and 4. As described above, the origin point position PL is defined as the origin point of the local coordinate system. Alternatively, the origin point of the local coordinate system may be defined at other positions. Therefore, the quasi-fixed point may also be referred to as a particular point in the following explanation. In a case where there is a movement that causes rotation in the excavator 100 that is working, the fulcrum of the rotation does not move, and therefore, if the quasi-fixed point is located at the fulcrum, this most greatly reduces the error in the position derived by the control system 200, e.g., the position of a particular portion of the work device 2 or the position of the work device 2 including the position of the 8 blade end 8T of the bucket. Even when the quasi-fixed point cannot be adopted as the fulcrum of the rotation, the error in the position derived by the control system 200 (the position of the work device 2) can be reduced by setting the quasi-fixed point as close as the fulcrum. The fulcrum when the upper swing body 3 swings is on the swing center axis, and more specifically, the fulcrum is on the axis z, and therefore, the quasi-fixed point is defined on the axis z. The fulcrum of the rotation in the direction of the roll angle θ4 and the direction of the pitch angle θ5 is not a constant point, but the fulcrum is considered to be on the surface with which the excavator 100 comes into contact at all times. In the embodiment, as described above, the origin point position PL is the cross point of the z axis which is the rotation center axis of the swing body and the plane corresponding to the surface with which the travelling apparatus 5 comes into contact. In the embodiment, the origin point position PL which is the quasi-fixed point is defined on the surface with which the excavator 100 comes into contact, so that this can reduce the error in the position derived by the control system 200, i.e., the absolute positions of the GNSS antennas 21, 22, when a problem occurs in the position determination with RTK-GNSS.

The excavator 100 can perform various kinds of works, but in a case of, e.g., a construction of finishing of a slope, excavation and smoothing may be performed by performing only the operation of the work device 2 or the upper swing body 3 while the travelling apparatus 5 is at a stop. In a case where the excavator 100 capable of performing computerized construction is used to perform constructions such as slope finishing construction and the like, the control system 200 can continue the excavation control and the display of the guidance screen and can appropriately continue the computerized construction by backing up the position determination with RTK-GNSS by using the quasi-fixed point.

The control system 200 of the excavator 100 performs the position determination to determine the absolute positions of the GNSS antennas 21, 22. Therefore, when a problem occurs in the position determination with RTK-GNSS, the control system 200 can back up the position determination with RTK-GNSS by calculating and deriving the absolute positions of the GNSS antennas 21, 22 as explained later.

The expression (1) is an expression for converting a difference of the position vector of the origin point position PL and the position vector of the GNSS antennas 21, 22 in the local coordinate system into a difference of the position vector of the origin point position PL and the position vector of the GNSS antennas 21, 22 in the global coordinate system. The expression (2) can be obtained from the expression (1). The expression (3) is expressed as an expression for deriving a calculation value Ralc by replacing a measurement value Ral of the position vector of the GNSS antennas 21, 22 in the global coordinate system of the expression (1) with a calculation value Ralc of the position vector of the GNSS antennas 21, 22 in the global coordinate system.

$$Rfl - Ral = Clb\ (Rfb - Rab) \quad (1)$$

$$Rfl = Clb\ (Rfb - Rab) + Ral \quad (2)$$

$$Ralc = Clb\ (Rab - Rfb) + Rfl \quad (3)$$

In this case,

Rfb: calibration value of the position vector of the origin point position PL in the local coordinate system Rab: calibration value of the position vector of the GNSS antennas 21, 22 in the local coordinate system Rfl: calculation value of the position vector of the origin point position PL in the global coordinate system Ral: measurement value of the position vector of the GNSS antennas 21, 22 in the global coordinate system Ralc: calculation value of the position vector of the GNSS antennas 21, 22 in the global coordinate system Clb: coordinate rotation matrix from the local coordinate system into the global coordinate system The calibration values are the values of the positions of the origin point position PL and the GNSS antennas 21, 22 obtained by measuring each position and dimension of the excavator 100, and are stored in the storage unit 26M of the work device controller 26 and the storage unit 39M of the sensor controller 39. The calibration value may be based on the design dimension of the excavator 100, but since there is a variation for each excavator 100, and therefore, it is preferable to obtain calibration values on the basis of measurement (calibration) as explained above. The coordinate rotation matrix Clb is expressed as the expression (4) by using the roll angle θ4, the pitch angle θ5, and the yaw angle, i.e., the azimuth angle θdi. The roll angle θ4, the pitch angle θ5, and the azimuth angle θdi are derived by causing the posture angle computation unit 39A to integrate the angular velocity ωx about the x axis, the angular velocity ωy about the y axis, and the angular velocity ωz about the z axis, which are detected by the IMU 24, with respect to the time. In the expression (4), sx is sin θ4, sy is sin θ5, sz is sin θdi, cx is cos θ4, cy is cos θ5, and cz is cos θdi.

$$Clb = \begin{bmatrix} cz \cdot cy & -sz \cdot cx + cz \cdot sy \cdot sx & sz \cdot sx + cz \cdot sy \cdot cx \\ sz \cdot cy & cz \cdot cx + sz \cdot sy \cdot sx & -cz \cdot sx + sz \cdot sy \cdot cx \\ -sy & cy \cdot sx & cy \cdot cx \end{bmatrix} \quad (4)$$

The control system 200 can derive a particular point which is the quasi-fixed point (the origin point position PL in the embodiment) by using the expression (2). The control system 200 can derive the absolute positions of the GNSS antennas 21, 22 by using the particular point which is the quasi-fixed point by using the expression (3). The control system 200 can derive the absolute positions of the GNSS antennas 21, 22 when a problem occurs in the position determination with RTK-GNSS by using the expression (2) and the expression (3).

More specifically, in a case where the position determination with RTK-GNSS is normal, the posture angle computation unit 39A provided in the sensor controller 39 of the control system 200 derives the roll angle θ4, the pitch angle θ5, and the azimuth angle θdi, and outputs the roll angle θ4, the pitch angle θ5, and the azimuth angle θdi to the blade end position calculation unit 28A of the display controller 28. In this case, the posture angle computation unit 39A uses the reference position data P1, P2 obtained from the global coordinate computation apparatus 23 to obtain the azimuth angle θdc in the global coordinate system (the azimuth angle θda in this case). Since the swing body azimuth data Q are obtained with the reference position data P1, P2, the position of the work device 2 derived in the local coordinate system can be derived as the position of the work device 2 in the global coordinate system. The posture angle computation unit 39A stores the obtained azimuth angle θda to the storage unit 39M as the azimuth angle in the normal state, i.e., the azimuth angle θdib before a problem occurs in the position determination with RTK-GNSS. In the example as shown in FIG. 6, the azimuth angle θdi indicates the inclination of the x axis which is the longitudinal axis of the upper swing body 3 with respect to the Y axis of the global coordinate system (X, Y, Z). The azimuth D1 of the excavator 100 is determined by the azimuth angle θdi.

The position information computation unit 39B derives the coordinate rotation matrix Clb from the roll angle θ4, the pitch angle θ5, and the azimuth angle θdi derived by the posture angle computation unit 39A. The position information computation unit 39B derives the measurement value Ral of the position vector of the GNSS antennas 21, 22 in the global coordinate system from the reference position data P1, P2 obtained from the global coordinate computation apparatus 23 in the status in which the position determination with RTK-GNSS is normal. Then, the position information computation unit 39B derives the calculation value Rfl of the position vector of the origin point position PL in the global coordinate system by giving the coordinate rotation matrix Clb and the measurement value Ral of the position vector which have been derived to the expression (2). Hereinafter, the calculation value Rfl may be referred to as a normal state origin point position Rfl as necessary. The position information computation unit 39B stores the derived normal state origin point position Rfl to the storage unit 39M. Then, the position information computation unit 39B outputs the reference position data P1, P2 obtained from the global coordinate computation apparatus 23 to the blade end position calculation unit 28A of the display controller 28 as the reference position data P1c, P2c.

In a case where a problem occurs in the position determination with RTK-GNSS, or in a case where the excavator 100 is no longer in the static status (as necessary, this will be hereinafter referred to as a case where a position determination problem and the like occurs), the posture angle computation unit 39A derives the roll angle θ4, the pitch angle θ5, and the azimuth angle θdi by using the detection values of the IMU 24. The posture angle computation unit 39A derives, as the azimuth angle θdi, the summation of the azimuth angle θdib before the problem occurs in the position determination with RTK-GNSS which is stored in the storage unit 39M and the azimuth angle θdia obtained by integrating the angular velocity ωz about the z axis with respect to the time after the position determination problem and the like occurs. The posture angle computation unit 39A outputs the roll angle θ4 and the pitch angle θ5, which have been derived, and also the azimuth angle θdi to the blade end position calculation unit 28A of the display controller 28 as the azimuth angle θdc.

The position information computation unit 39B generates the coordinate rotation matrix Clb by using the roll angle θ4, the pitch angle θ5, and the azimuth angle θdi after the position determination problem and the like occurs, which have been obtained from the posture angle computation unit 39A. The position information computation unit 39B reads the normal state origin point position Rfl before the position determination problem and the like occurs, which is stored in the storage unit 39M. Then, the position information computation unit 39B derives the calculation value Ralc of the position vector of the GNSS antennas 21, 22 in the global coordinate system by giving the normal state origin point position Rfl, which has been read, and the coordinate rotation matrix Clb, which has been generated, to the expression (3). The position information computation unit 39B derives the reference position data P1i, P2i of the GNSS antennas 21, 22 from the calculation value Ralc of the position vector, and outputs the reference position data P1i, P2i of the GNSS antennas 21, 22 to the blade end position calculation unit 28A of the display controller 28 as the reference position data P1c, P2c. Since the swing body azimuth data Q can be obtained from the reference position data P1c, P2c, the position of the work device 2 derived in the local coordinate system can be derived as the position of the work device 2 in the global coordinate system. The operation of the sensor controller 39 of the control system 200 in the case where the position determination problem and the like occurs corresponds to the second mode explained above.

In a case where the upper swing body 3 swings, the position information computation unit 39B derives the azimuth angle θdi during swinging as explained below. In the example as shown in FIG. 7, suppose that the upper swing body 3 of the excavator 100 starts swinging in the direction indicated by an arrow RT from the status of the azimuth D1. The azimuth angle at the start of swinging is θdib, and is stored in the storage unit 39M of the sensor controller 39. The posture angle computation unit 39A derives the azimuth angle θdia from the azimuth D1 (azimuth angle variation) by integrating the swing angular velocity ω of the upper swing body 3, which has started swinging from the azimuth D1, with respect to the time, and outputs the azimuth angle θdia to the position information computation unit 39B. The position information computation unit 39B adds the azimuth angle θdia from the azimuth D1 and the azimuth angle θdib at the start of swinging that has been read from the storage unit 39M, and adopts the obtained value as the azimuth angle θdi during swinging. The azimuth D2 of the excavator 100 during swinging is determined by the azimuth angle θdi.

In a case where the position determination problem and the like occurs, the control system 200 derives the reference position data P1i, P2i by using the origin point position PL obtained by using the reference position data P1, P2 normally determined before the position determination problem and the like occurs. Therefore, even when the position determination problem and the like occurs, the control system 200 can derive the absolute positions of the GNSS antennas 21, 22. As a result, even when the position determination problem and the like occurs, the excavator 100 having the control system 200 can continue the excavation control and the like using the absolute positions of the GNSS antennas 21, 22. Subsequently, processing in which the control system 200 according to an embodiment generates position information IPL will be explained.

<Processing for Generating Position Information IPL>

Figure 8:
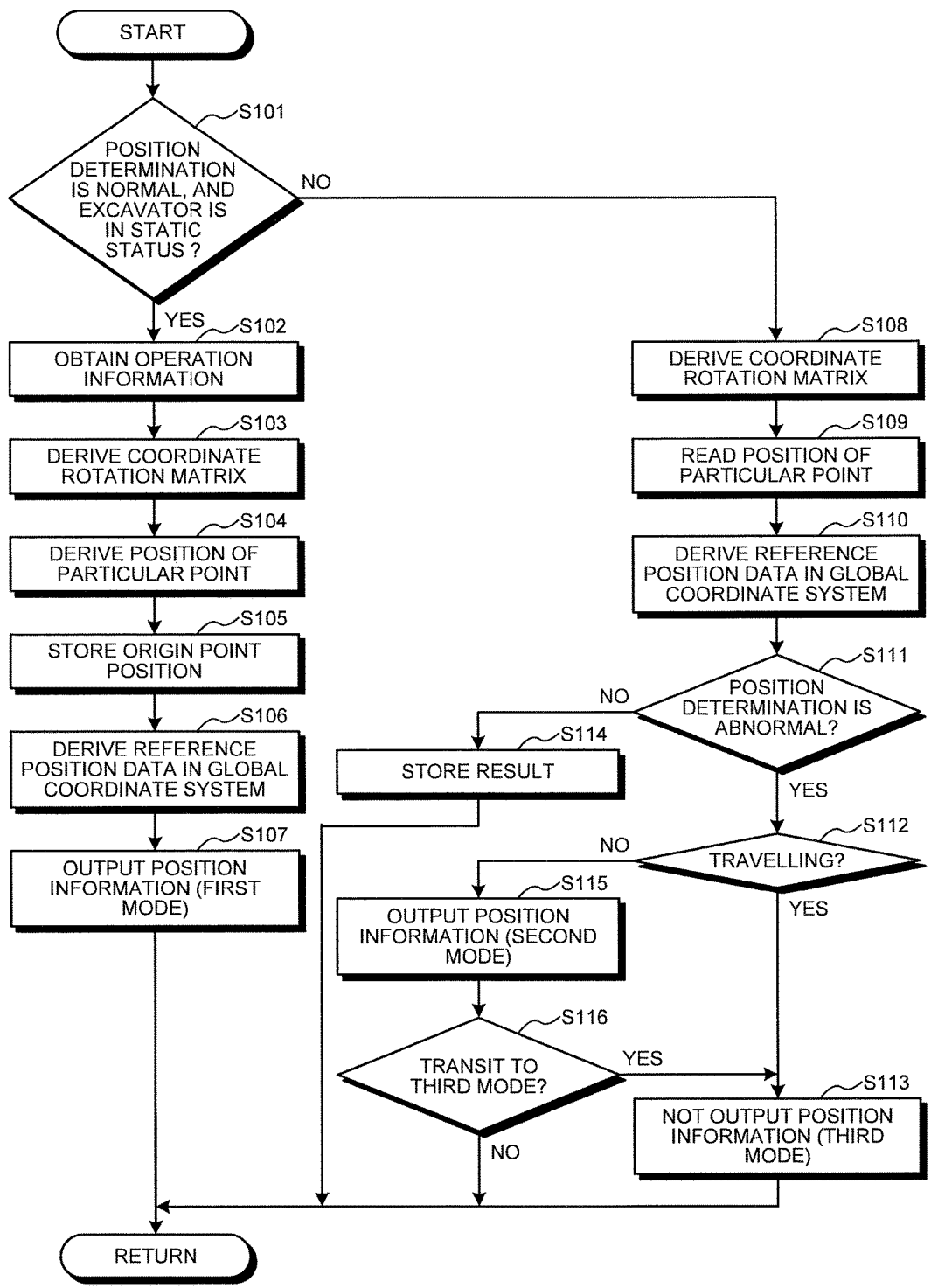
FIG. 8 is a flowchart illustrating an example of processing in which the control system according to the embodiment generates position information.

FIG. 8 is a flowchart illustrating an example of processing in which the control system 200 according to the embodiment generates the position information IPL. In step S101, the processor unit 39P of the sensor controller 39 determines whether the position determination performed by the global coordinate computation apparatus 23 is normal or not, and whether the excavator 100 is in the static status. Whether the position determination performed by the global coordinate computation apparatus 23 is normal or not is determined as follows.

(1) In a case where an error occurs in terms of the position determination of the global coordinate computation apparatus 23 or the value of the coordinate data of the GNSS antennas 21, 22 in the Z direction is more than a threshold value, the position determination performed by the global coordinate computation apparatus 23 is abnormal. In a case where the value of the coordinate data of the GNSS antennas 21, 22 in the Z direction is equal to or less than the threshold value, the position determination performed by the global coordinate computation apparatus 23 may be determined to be abnormal.

(2) In a case where any error does not occur in terms of the position determination of the global coordinate computation apparatus 23, and the value of the coordinate data of the GNSS antennas 21, 22 in the Z direction is less than a threshold value, the position determination performed by the global coordinate computation apparatus 23 is normal. When the value of the coordinate data of the GNSS antennas 21, 22 in the Z direction is more than the threshold value, the position determination performed by the global coordinate computation apparatus 23 may be determined to be normal.

Whether the excavator 100 is in the static status or not is determined as follows. In the following explanation, when the operation lever of the operation device 25 is ON, this means that the operation lever is operated and is not in the neutral state. When the operation lever of the operation device 25 is OFF, this means that the operation lever is not operated and is in the neutral state.

(1) In a case where the left operation lever 25L is operated either right or left and the left operation lever 25L is ON, or in a case where at least one of the travelling lever 25FL and the travelling lever 25FR is ON, or in a case where the status continues for a first period of time ta in which the absolute value of the swing angular velocity ω is equal to or more than the swing angular velocity threshold value ωc, then, the excavator 100 is in the non-static status, i.e., dynamic status. The swing angular velocity threshold value we is not particularly limited, but in this embodiment, the swing angular velocity threshold value ωc is 1 degrees per second. The first period of time ta is not particularly limited, but, for example, 0.03 seconds. The reason why the fact that the case where the status continues for the first period of time ta in which the absolute value of the swing angular velocity ω is equal to or more than the swing angular velocity threshold value ωc is the non-static status is included in one of the determination conditions is as follows. Suppose that the operator releases his or her hand from the left operation lever 25L in order to stop swinging when the operator was operating the left operation lever 25L in order to swing the upper swing body 3. At this occasion, the left operation lever 25L is in the neutral position, and the left operation lever 25L is OFF. However, at this point in time, the upper swing body 3 may be considered to be swinging for a certain period of time due to an inertial force. More specifically, in this state, the excavator 100 may be said to be dynamic status. Therefore, not only ON/OFF of each operation lever but also the case where the status continues for a predetermined period of time in which the absolute value of the swing angular velocity ω is equal to or more than a predetermined threshold value is the non-static is included in one of the determination conditions.

(2) In a case where the left operation lever 25L is not operated either right or left, and the left operation lever 25L is OFF, and both of the travelling lever 25FL and the travelling lever 25FR are OFF, and further, the status continues for a second period of time tb in which the absolute value of the swing angular velocity ω is less than the swing angular velocity threshold value ωc, then the excavator 100 is in the static status, i.e., static status. The second period of time tb is not particularly limited, but the second period of time tb is more than the first period of time ta, and, for example, 4 seconds.

In the embodiment, whether the excavator 100 is in the static status or not is determined on the basis of the detection value STr of the pressure sensor 66 detecting the pilot pressure of the left operation lever 25L and the right operation lever 25R and the detection value STd of the pressure sensor 27PC detecting the pilot pressure of the travelling lever 25FL and the travelling lever 25FR as shown in FIG. 2. In a case where the detection values STr, STd of the pressure sensors 66, 27PC are more than the first threshold value of the pilot pressure, the processor unit 39P of the sensor controller 39 determines the non-static status. In a case where the detection values STr, STd of the pressure sensors 66, 27PC are less than the second threshold value that is less than the first threshold value of the pilot pressure, the processor unit 39P of the sensor controller 39 determines the static status.

The processor unit 39P of the sensor controller 39 determines the static status and the non-static status of the excavator 100 by using the detection values STr, STd of the pressure sensors 66, 27PC, but the determination of the static status and the non-static status is not limited to the method using the detection values of the pressure sensors 66, 27PC. In a case where the amount of operation of the left operation lever 25L, the right operation lever 25R, the travelling lever 25FL, and the travelling lever 25FR is an operation device 25 of an electric method detected with a potentiometer, a hole IC, or the like, the processor unit 39P of the sensor controller 39 may determine the static status and the non-static status of the excavator 100 by using the output value of the potentiometer or the hole IC. Further, the processor unit 39P of the sensor controller 39 may determine the static status and the non-static status of the excavator 100 by using the detection values of the IMU 24. For example, when the IMU 24 detects the swing angular velocity ω, or detects acceleration in at least one of the directions including the x axis direction, the y axis direction, and the z axis direction, the processor unit 39P of the sensor controller 39 can determine that the excavator 100 is in the non-static status.

In a case where the position determination performed by the global coordinate computation apparatus 23 is normal and the excavator 100 is in the static status (step S101, Yes), the posture angle computation unit 39A of the sensor controller 39 obtains the operation information MI from the IMU 24 in step S102. The posture angle computation unit 39A derives the roll angle θ4, the pitch angle θ5, and the azimuth angle θdi which are the position information IPL from the obtained operation information MI, and outputs the roll angle θ4, the pitch angle θ5, and the azimuth angle θdi to the position information computation unit 39B as the roll angle θ4, the pitch angle θ5, and the azimuth angle θdc.

In step S103, the position information computation unit 39B derives the coordinate rotation matrix Clb from the roll angle θ4, the pitch angle θ5, and the azimuth angle θdi (θdc) thus obtained. In step S104, the position information computation unit 39B derives the position of the particular point (the origin point position PL in the embodiment) by giving the coordinate rotation matrix Clb and the measurement value Ral of the position vector of the GNSS antennas 21, 22 based on the reference position data P1, P2 obtained from the global coordinate computation apparatus 23 to the expression (2). In step S105, the position information computation unit 39B stores the derived origin point position PL to the storage unit 39M.

In step S106, the position information computation unit 39B derives the reference position data P1c, P2c in the global coordinate system, and outputs the reference position data P1c, P2c to the blade end position calculation unit 28A of the display controller 28 as the position information IPL in step S107. As described above, the reference position data P1c, P2c which are output to the blade end position calculation unit 28A are the reference position data P1, P2 obtained from the global coordinate computation apparatus 23. Step S107 corresponds to the first mode. When step S107 is finished, the processor unit 39P of the sensor controller 39 returns back to step S101, and executes subsequent processing.

Back to step S101, in a case where the position determination performed by the global coordinate computation apparatus 23 is abnormal and the excavator 100 is in the non-static status (step S101, No), the position information computation unit 39B derives the coordinate rotation matrix Clb from the azimuth angle θdia obtained by integrating the roll angle θ4, the pitch angle θ5, and the swing angular velocity ω obtained from the posture angle computation unit 39A in step S108 and the azimuth angle θdib stored in the storage unit 39M. The azimuth angle θdi which the position information computation unit 39B uses to derive the coordinate rotation matrix Clb is obtained by reading the azimuth angle θdib stored to the storage unit 39M that is obtained a predetermined period of time before the point in time at which a determination "NO" is made in step S101, and as described above, the summation of the azimuth angle θdib and the azimuth angle θdia is derived as the azimuth angle θdi. Further, the coordinate rotation matrix Clb is derived by using the derived azimuth angle θdi and the expression (4).

In this case, the predetermined time is determined by the communication time between the global coordinate computation apparatus 23 and the sensor controller 39 and the computation time of the sensor controller 39, and therefore, the predetermined time is not limited to a particular value, but the predetermined time is, for example, 0.3 seconds.

In step S109, the position information computation unit 39B reads the position of the particular point stored in the storage unit 39M of the sensor controller 39 (the origin point position PL in the embodiment). In the embodiment, the sensor controller 39 stores, to the storage unit 39M, the origin point position PL before the point in time at which a determination "No" is made in step S101. In step S109, the position information computation unit 39B reads the origin point position PL stored in the storage unit 39M that is obtained the predetermined period of time before the point in time at which a determination "No" is made in step S101. The predetermined time in step S109 is the same as the predetermined time in step S108.

Step S108 and step S109 use the azimuth angle θdi and the origin point position PL stored in the storage unit 39M that is obtained a predetermined period of time before the time at which a determination "No" is made in step S101. Therefore, the position information computation unit 39B can use the origin point position PL and the azimuth angle θdi obtained when the position determination performed by the global coordinate computation apparatus 23 is surely normal.

In step S110, the position information computation unit 39B derives the reference position data P1$i$, P2$i$ in the global coordinate system by giving the coordinate rotation matrix Clb derived in step S108 and the origin point position PL read out in step S109 to the expression (3). Subsequently, in step S111, the processor unit 39P of the sensor controller 39 determines whether the position determination performed by the global coordinate computation apparatus 23 is abnormal or not. This determination is as described above.

In a case where the position determination performed by the global coordinate computation apparatus 23 is abnormal (step S111, Yes), the processor unit 39P of the sensor controller 39 determines whether the excavator 100 is travelling or not in step S112. In a case where at least one of the travelling lever 25FL and the travelling lever 25FR is ON, the processor unit 39P determines that the excavator 100 is travelling, and in a case where both of the travelling lever 25FL and the travelling lever 25FR are OFF, the excavator 100 is determined not to be travelling, and more specifically, the excavator 100 is determined to be at a stop.

In a case where the excavator 100 is determined to be travelling (step S112, Yes), step S113 is subsequently performed, and the position information computation unit 39B and the posture angle computation unit 39A of the sensor controller 39 do not output the position information IPL to the blade end position calculation unit 28A of the display controller 28. In a case where the excavator 100 is determined to be travelling, the position of the particular point (the origin point position PL in the embodiment) also moves together with the excavator 100, and therefore, the origin point position PL after it has moved is different from the origin point position PL stored in the storage unit 39M that is obtained a predetermined period of time before a determination "No" is made in step S101. Therefore, in a case where the excavator 100 is determined to be travelling, the reference position data P1$i$, P2$i$ in the global coordinate system derived by using the origin point position PL that is obtained before a determination "No" is made in step S101 are different from the actual reference position data P1, P2 of the travelling excavator 100.

In a case where the excavator 100 is determined to be travelling, the position information computation unit 39B and the posture angle computation unit 39A do not output the position information IPL to the blade end position calculation unit 28A of the display controller 28. With such processing, the blade end position calculation unit 28A of the display controller 28 does not generate the bucket blade end position data S, and therefore, the target excavation topographical data generation unit 28B does not generate the target excavation topographical data U either. Since there is no target excavation topographical data U, the work device controller 26 and the display controller 28 do not execute processing using the target excavation topographical data U, for example, excavation control and displaying of the excavation helping guidance screen on the display unit 29. As described above, in a case where the excavator 100 is determined to be travelling, the control system 200 does not execute the excavation control based on the position different from the actual position or displaying of the excavation helping guidance screen.

Step S113 corresponds to the third mode. When step S113 is finished, the processor unit 39P of the sensor controller 39 returns back to step S101, and executes subsequent processing.

Back to step S111, in a case where the position determination performed by the global coordinate computation apparatus 23 is not abnormal, i.e., normal (step S111, No), the processor unit 39P of the sensor controller 39 stores, to the storage unit 39M of the sensor controller 39, the azimuth angle θdi obtained in step S108 and the reference position data P1$i$, P2$i$ derived in step S110 in step S114. When step S114 is finished, the processor unit 39P of the sensor controller 39 returns back to step S101, and executes subsequent processing.

In a case where the position determination performed by the global coordinate computation apparatus 23 is determined to be normal in step S111, the processor unit 39P of the sensor controller 39 derives, in step S114, only the reference position data P1$i$, P2$i$ in the global coordinate system by using the origin point position PL obtained before a determination "No" is made in step S101. In step S114, the processor unit 39P outputs the reference position data P1, P2 obtained from the global coordinate computation apparatus 23 to the blade end position calculation unit 28A of the display controller 28 as the reference position data P1$c$, P2$c$.

Subsequently, back to step S112, in a case where the excavator 100 is not travelling (step S112, No), the position information computation unit 39B and the posture angle computation unit 39A of the sensor controller 39 output, in step S115, the roll angle θ4, the pitch angle θ5, and the azimuth angle θdi (θdc) obtained in step S108, and the reference position data P1$i$, P2$i$ derived in step S110, to the blade end position calculation unit 28A of the display controller 28 as the position information IPL. Step S115 corresponds to the second mode.

Subsequently, step S116 is subsequently performed, and the processor unit 39P of the sensor controller 39 determines whether to go into the third mode or not. In a case where a condition for going into the third mode is satisfied (step S116, Yes), step S113 is subsequently performed, and the position information computation unit 39B and the posture angle computation unit 39A of the sensor controller 39 do not output the position information IPL to the blade end position calculation unit 28A of the display controller 28. In a case where a condition for going into the third mode is not satisfied (step S116, No), the processor unit 39P of the sensor controller 39 returns back to step S101, and executes subsequent processing. Subsequently, transition of the operation of the sensor controller 39 from the first mode, to the second mode and then to the third mode will be explained.

<Transition of the Operation of the Sensor Controller 39>

Figure 9:
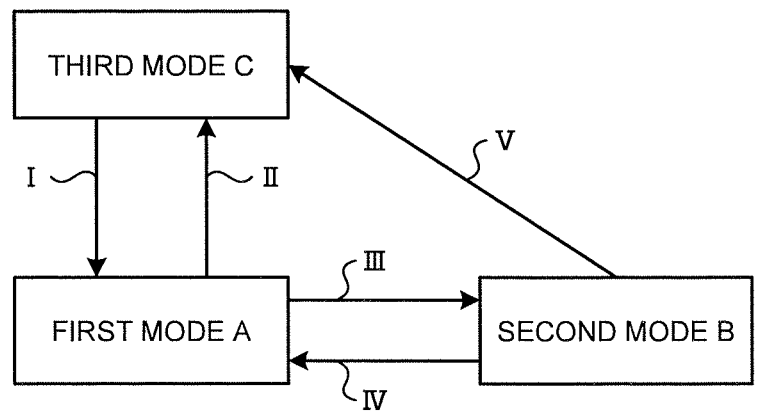
FIG. 9 is a figure illustrating a transition of a mode in which a sensor controller operates.

FIG. 9 is a figure illustrating a transition of a mode in which the sensor controller 39 operates. In a case where the position determination performed by the global coordinate computation apparatus 23 is normal and the excavator 100 is in the static status, the sensor controller 39 operates in the first mode A. When the position determination performed by the global coordinate computation apparatus 23 is abnormal and the excavator 100 is in the non-static status, i.e., the travelling status, the sensor controller 39 makes a transition (II) from the operation in the first mode A to the operation in the third mode C. When the position determination performed by the global coordinate computation apparatus 23 is abnormal and the excavator 100 is in the non-travelling status, the sensor controller 39 makes a transition (III) from the operation in the first mode A to the operation in the second mode B. When the position determination performed by the global coordinate computation apparatus 23 is normal and the excavator 100 is the non-swinging state, the sensor controller 39 makes a transition (IV) from the operation in the second mode B to the operation in the first mode A. When a condition for transition to the third mode is satisfied during the operation in the second mode B, the sensor controller 39 makes a transition (V) to the operation in the third mode C. When the position determination performed by the global coordinate computation apparatus 23 becomes normal during the operation in the third mode C, the sensor controller 39 makes a transition (I) to the operation in the first mode A.

The details of the condition for transition to the third mode will be explained in details.

(1) A condition for transition (V) from the second mode B to the third mode C is satisfied in a case where a time tc2 of operation in the second mode B is more than a threshold value (first condition) or a case where the excavator 100 is travelling (second condition) or a case where there is an abnormality in the sensor of the excavator 100 (third condition). The threshold value is not particularly limited, but, for example, 60 seconds. For example, the magnitude of the threshold value may be configured to be changed to any value by an input device, not shown, of the display unit 29. The reason why whether the time tc2 of operation in the second mode B is more than the threshold value is included in the condition for transition from the second mode B to the third mode C as described above will be explained later. In the embodiment, the abnormality of the sensor of the excavator 100 is abnormality in at least one of equipment for detecting the operation of the excavator 100 and equipment for deriving the position of the excavator 100. Examples of equipment for detecting the operation of the excavator 100 include the IMU 24, the pressure sensors 66, 27PC, 68, the first stroke sensor 16, the second stroke sensor 17, the third stroke sensor 18, and the sensor controller 39, but are not limited thereto. Examples of equipment for deriving the position of the excavator 100 include the GNSS antennas 21, 22, the global coordinate computation apparatus 23, the sensor controller 39, the first stroke sensor 16, the second stroke sensor 17, and the third stroke sensor 18, but are not limited thereto. Both of the functions of the equipment for detecting the operation of the excavator 100 and the equipment for deriving the position of the excavator 100 may be realized by common equipment.

(2) A condition for transition (V) from the second mode B to the third mode C is satisfied in a case where the upper swing body 3 swings greater than a threshold value of the swing angle in the same direction (for example, 250 degrees as a particular angle) (fourth condition) during the operation in the second mode B. The particular angle corresponds to a threshold value of swing angle. For example, the magnitude of the threshold value may be changed to any value by an input device, not shown, of the display unit 29. The reason why whether the upper swing body 3 swings greater than the threshold value of the swing angle in the same direction is included in the condition for transition from the second mode B to the third mode C as described above will be explained later. As described above, a transition from the first condition to the fourth condition which is a condition for a transition (V) from the second mode B to the third mode C has been explained. In a case where any one of the conditions for transition from the first condition to the fourth condition is satisfied, a transition (V) occurs from the second mode B to the third mode C.

Figure 10:
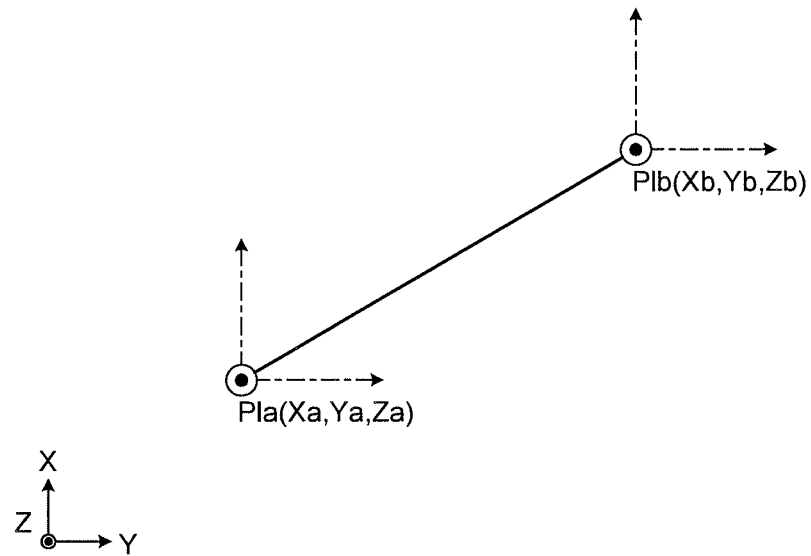
FIG. 10 is a figure for explaining a condition of transition to a third mode.
Figure 11:
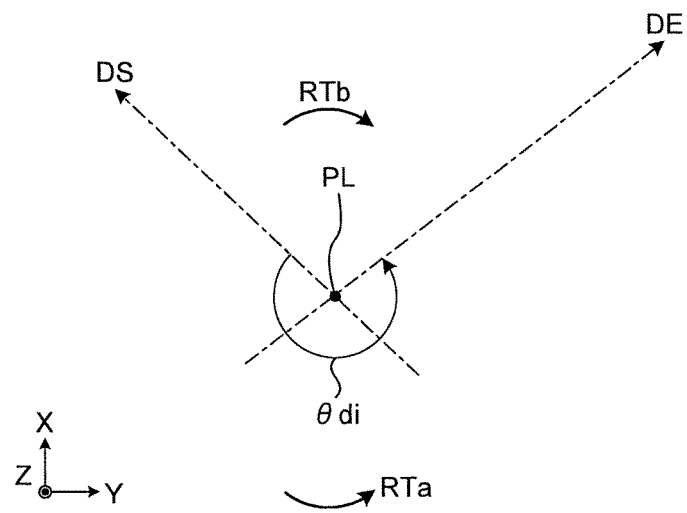
FIG. 11 is a figure for explaining a condition of transition to the third mode.

FIGS. 10 and 11 are figures for explaining a condition of transition to the third mode. Any of the origin point positions PLa (Xa, Ya, Za), PLb (Xb, Yb, Zb) shown in FIG. 10 is expressed in the global coordinate system. The origin point position PLa of FIG. 10 is the position at which the excavator 100 is stationary. The origin point position PLa is stored in the storage unit 39M of the sensor controller 39, and suppose that the sensor controller 39 generates the position information IPL by using the origin point position PLa in a case where the position determination performed by the global coordinate computation apparatus 23 is abnormal. Suppose that, in this status, the excavator 100 moves from the origin point position PLa to the origin point position PLb. The actual origin point position PL of the excavator 100 is the origin point position PLb, and in a case where the position determination performed by the global coordinate computation apparatus 23 is abnormal, the sensor controller 39 generates the position information IPL by using the origin point position PLa different from the actual origin point position PLb. Therefore, in a case where the excavator 100 is travelling when the excavator 100 is operating in the second mode, the sensor controller 39 transits to the third mode, thus avoiding generation of the position information IPL using the origin point position PLa different from the reality.

The azimuth DS of FIG. 11 indicates an azimuth when the sensor controller 39 starts operation in the second mode, and the azimuth DE indicates an azimuth when the upper swing body 3 swings greater than 180 degrees in the same direction after operation in the second mode is started. The arrow RTa indicates the swing direction when the upper swing body 3 swings greater than 180 degrees in the same direction. The arrow RTb indicates the swing direction in a case where the upper swing body 3 swings in the direction opposite to the arrow RTa and attains the azimuth DE.

In the second mode, the posture angle computation unit 39A of the sensor controller 39 derives the azimuth angle θdi by integrating the swing angular velocity ω with respect to the time. Therefore, when there is an increase in the amount of swing for which the upper swing body 3 swings in the same direction, an error caused by the characteristics of the IMU 24, i.e., the error due to the integration of the swing angular velocity ω, is accumulated and this may reduce the precision of the azimuth angle θdi. In a case where the upper swing body 3 changes from the status of the azimuth DS to the azimuth DE, there are two swing directions of the upper swing body 3. In normal cases, the operator of the excavator 100 employs a swing direction in which the amount of swing of the upper swing body 3 is less than 180 degrees. More specifically, when the upper swing body 3 swings from the azimuth DS to the azimuth DE in the example as shown in FIG. 11, the operator selects the swing direction indicated by the arrow RTb in normal cases. Therefore, when the upper swing body 3 swings a large swing angle (particular swing angle), for example, more than 250 degrees, in the same direction, during the operation in the second mode B, this is an operation that is not executed in normal cases, and as a result, the sensor controller 39 transits to the third mode C. With such processing the sensor controller 39 can reduce the error of the azimuth angle θdi.

Depending on the type of the IMU 24, the detection error of the swing angular velocity ω may increase as the time passes in a case where the upper swing body 3 is not swinging. Therefore, when the time tc2 of operation in the second mode B is more than a threshold value, the sensor controller 39 transits to the third mode. With such processing, the sensor controller 39 can reduce the error of the azimuth angle θdi.

As described above, in a case where an abnormality occurs in the sensor of the excavator 100 while the sensor controller 39 is operating in the second mode, the sensor controller 39 transits to the third mode. The abnormality of the sensor that causes transition to the third mode includes a communication abnormality between the IMU 24 the sensor controller 39, a communication abnormality between the sensor controller 39 and another controller (the display controller 28, the work device controller 26, the pump controller, and the like), an abnormality of the IMU 24, an abnormality of the pressure sensors 66, 27PC.

Figure 12:
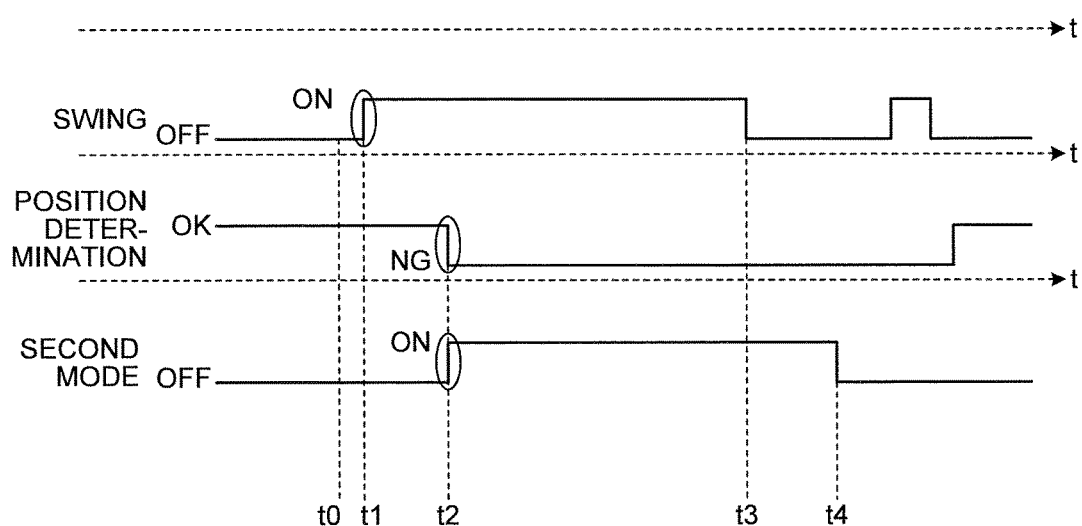
FIG. 12 is a timing chart of processing executed by a sensor controller when an upper swing body swings.

FIG. 12 is a timing chart of processing executed by the sensor controller 39 when the upper swing body 3 is swinging. In the embodiment, a transition from the first mode A to the second mode B when the upper swing body 3 starts swinging will be explained. When the upper swing body 3 starts swinging (swing ON), the sensor controller 39 derives the reference position data P1*i*, P2*i* in the global coordinate system by using the origin point position PL and the azimuth angle θdib before the excavator 100 attains the non-static status. However, when the position determination performed by the global coordinate computation apparatus 23 is normal (position determination OK), the sensor controller 39 does not transit to the second mode B, and operates in the first mode A.

The timing chart as shown in FIG. 12 shows that the upper swing body 3 starts to swing when the time t is tl, but at this point in time (t=t1), the sensor controller 39 only derives the reference position data P1*i*, P2*i* in the global coordinate system by using the origin point position PL and the azimuth angle θdib at the time t=t0 before the excavator 100 attains the non-static status, and stores the reference position data P1*i*, P2*i* to the storage unit 39M. The period of time from t1 to t0 corresponds to the predetermined time explained above, and is, for example, 0.3 seconds. More specifically, the sensor controller 39 stores the reference position data P1*i*, P2*i* to the storage unit 39M at the time to. In a case where the upper swing body 3 is swinging and the position determination performed by the global coordinate computation apparatus 23 is normal, the sensor controller 39 outputs the azimuth angle θdi derived from the swing angular velocity ω detected by the IMU 24 and the reference position data P1, P2 obtained from the global coordinate computation apparatus 23. More specifically, the sensor controller 39 operates in the first mode A, and the second mode B is OFF.

At the time t=t2, suppose that the position determination performed by the global coordinate computation apparatus 23 becomes abnormal (position determination NG) while the upper swing body 3 is swinging. Then, the sensor controller 39 transits from the operation in the first mode A to the operation in the second mode B (second mode B is ON). When the swinging of the upper swing body 3 is finished at the time t=t3 (swing OFF), the operation of the sensor controller 39 is determined by the status of the position determination performed by the global coordinate computation apparatus 23 and the status of the excavator 100. In the example as shown in FIG. 12, at the time t=t4, for example, the time tc2 of operation in the second mode B passes the threshold value (for example, 60 seconds) as explained above, and the condition for transition to the third mode C is satisfied, and after the time t=t4, the sensor controller 39 operates in the third mode C.

Subsequently, a case will be explained in which, while the upper swing body 3 is swinging, the position determination performed by the global coordinate computation apparatus 23 becomes abnormal, and accordingly, the sensor controller 39 transits to the second mode B, and thereafter, the upper swing body 3 does not finish swinging during operation in the second mode B, and the position determination becomes normal during swinging of the upper swing body 3. There is a delay of communication between the global coordinate computation apparatus 23 and the sensor controller 39. The global coordinate computation apparatus 23 and the sensor controller 39 require the time for processing the information. Therefore, even if the sensor controller 39 transits to the first mode A as soon as the position determination becomes normal while the upper swing body 3 is swinging, the position information IPL based on the detection value of the global coordinate computation apparatus 23 cannot be immediately transmitted to the display controller 28. Therefore, in the embodiment, in a case where the position determination performed by the global coordinate computation apparatus 23 becomes normal while the upper swing body 3 is swinging and the sensor controller 39 is operating in the second mode B, the sensor controller 39 continues operation in the second mode B until at least the swinging of the upper swing body 3 is finished. As a result, this can alleviate problems and the like in the excavation control of the work device 2 and displaying of the guidance screen on the basis of a sudden change in the reference position data P1*c*, P2*c* that are output from the sensor controller 39 to the display controller 28.

As described above, as a determination condition for transition from the second mode B to the first mode A, whether the upper swing body 3 is in the swinging state or the swinging finished state (non-swinging state) is adopted as the determination condition. This determination is made as follows. In a case where the left operation lever 25L is ON, or the status continues for a third period of time tc3 in which the absolute value of the swing angular velocity ω is equal to or more than the swing angular velocity threshold value ωd, the upper swing body 3 is in the swinging state. The swing angular velocity threshold value ωd is not particularly limited, but in the embodiment, the swing angular velocity threshold value ωd is 3 degrees/seconds. The third period of time tc is not particularly limited, but, for example, the third period of time tc is 0.03 seconds. In a case where the left operation lever 25L is OFF, and the status continues for a fourth time tc4 in which the absolute value of the swing angular velocity ω is less than the swing angular velocity threshold value ωd, the upper swing body 3 is in the swinging finished state. The fourth time td is not particularly limited, but, for example, the fourth time td is 1.5 seconds.

The control system 200 operates in the first mode in which the position information IPL is derived by using the result of the position determination with RTK-GNSS, the second mode in which the position information IPL is derived by using the origin point position PL and the azimuth angle θd when the position determination with RTK-GNSS is normal, and the third mode in which the position information IPL is not output. In a case where there is an abnormality in the position determination with RTK-GNSS, the control system 200 can realize backup in the second mode. In a case where the difference between the position derived by the control system 200 and the actual position of the excavator 100 may increase because of the status in which there is an abnormality in one of the equipment for detecting the operation of the excavator 100 and the equipment for deriving the position of the excavator 100 or the status in which the excavator 100 is travelling, the control system 200 does not output the position information IPL in the third mode. Therefore, the work device controller 26 does not execute the excavation control using the target excavation topographical data U, and the display controller 28 does not execute displaying of the excavation helping guidance screen. As a result, when the control system 200 performs computerized construction on the basis of the result obtained by determining the position of the excavator 100, the control system 200 can realize at least one of continue to appropriately controlling the work device 2 when the computerized construction is performed and displaying legitimate information on the guidance screen of the work.

In a case where the position determination with RTK-GNSS is normal, the control system 200 does not store the yaw angle which is output by the IMU 24, and the control system 200 derives the azimuth angle (absolute azimuth angle) θd in the global coordinate system from the measurement values from the two GNSS antennas 21, 22, and stores the azimuth angle (absolute azimuth angle) θd. Since the swing angular velocity ω of the upper swing body 3 is fast, the azimuth angle θdi which is output from the IMU 24 may include an error. Therefore, when the position determination with RTK-GNSS is normal, the azimuth angle θd is derived from the reference position data P1, P2 obtained by the global coordinate computation apparatus 23. With such processing, the control system 200 can suppress reduction in the precision of the reference position data P1i, P2i derived in the second mode when the upper swing body 3 is swinging.

When the excavator 100 includes not only the GNSS antennas 21, 22 and the global coordinate computation apparatus 23 but also an apparatus for deriving the azimuth angle θd in the global coordinate system, the control system 200 may derive the reference position data P1i, P2i obtained after, e.g., the position determination with RTK-GNSS have become abnormal, by using the azimuth angle θd in the global coordinate system obtained by the apparatus. An example of apparatus for deriving the azimuth angle θd in the global coordinate system includes a terrestrial magnetism sensor. In this case, the sensor controller 39 does not need to store, to the storage unit 39M, the azimuth angle θdib obtained using the reference position data P1, P2 obtained in a case where the position determination with RTK-GNSS is normal, and therefore, the load of the processing can be suppressed, and the storage unit 39M can reduce the storage capacity for storing the azimuth angle θdib.

In the embodiment, the display controller 28 of the control system 200 may display the status of the operation of the sensor controller 39 on the display unit 29 as shown in FIG. 2. For example, the display controller 28 causes the display unit 29 to display any one of the messages indicating that the operation of the sensor controller 39 is in the first mode, the second mode, and the third mode. With such processing, the operator of the excavator 100 can find what kind of mode the excavator 100 is currently in.

In the embodiment, when the position determination with RTK-GNSS is normal but the excavator 100 is in the non-static status, the sensor controller 39 of the control system 200 executes only the calculation of the position information IPL by using the origin point position PL and azimuth angle θda obtained before that, and outputs the reference position data P1, P2 determined by RTK-GNSS to the display controller 28 as the position information IPL. This operation of the sensor controller 39 will be referred to as a fourth mode. The display controller 28 may cause the display unit 29 to display any one of the first mode to the third mode, and in addition, the display controller 28 may cause the display unit 29 to display that the operation of the sensor controller 39 is in the fourth mode. With such processing, the operator of the excavator 100 can find, in a more detailed manner, what kind of mode the excavator 100 is currently in.

In the embodiment, the control system 200 may include a communication apparatus for communicating with a server of a management apparatus provided outside of the excavator 100, and may exchange information with the management apparatus server. The information exchanged between the control system 200 and the server of the management apparatus includes, e.g., information about the status of the excavator 100, and various kinds of commands transmitted from the server of the management apparatus to the control system 200 so as to cause the control system 200 to operate. In a case where the control system 200 includes a communication apparatus communicating with the management apparatus server, the control system 200 may transmit, to the server of the management apparatus, the status of the position determination with RTK-GNSS, the number of times the first mode to the fourth mode are executed, and information about the time of execution, and the time at which it is executed. With such processing, an administrator who manages the excavator 100 by using the management apparatus can easily find the status of the excavator 100 in details.

The embodiment has been hereinabove explained, but the embodiment is not limited by the contents described above. The constituent elements explained above include those that can be easily conceived of by a person skilled in the art and those substantially the same or so-called those in the scope of equivalent. Further, the constituent elements explained above can be combined as necessary. Further, at least one of various kinds of omissions, replacements, and changes of the constituent elements can be done without deviating from the gist of the embodiment. For example, each processing executed by the sensor controller 39 may be executed by the work device controller 26, the display controller 28, the pump controller, or any controller other than the above. The work machine is not limited to the excavator 100. The work machine may be other work machines such as a wheel loader or a bulldozer. The posture angle computation unit 39A and the position information computation unit 39B shown in FIG. 5 are provided in the sensor controller 39, but any one of or both of the posture angle computation unit 39A and the position information computation unit 39B may be provided in the display controller 28, or may be provided in any controller other than the display controller 28.

REFERENCE SIGNS LIST 1 vehicle main body
2 work device
3 upper swing body
5 travelling apparatus
5a, 5b crawler belt
5c hydraulic motor
6 boom
7 arm
8 bucket
8B blade
8T blade end
21, 22 antenna (GNSS antenna)
23 global coordinate computation apparatus
25 operation device
25R right operation lever
25L left operation lever
25FL, 25FR travelling lever
26 work device controller
27PC, 66, 68 pressure sensor
28 display controller
28A blade end position calculation unit
28B target excavation topographical data generation unit
28 target construction information storage unit
29 display unit
39 sensor controller
39A posture angle computation unit
39B position information computation unit
100 excavator
200 control system
Clb coordinate rotation matrix
IPL position information
MI operation information
P, P1, P1c, P1i, P2, P2c, P2i reference position data
PL, PLb origin point position
θ4 roll angle
θ5 pitch angle
θd, θda, θdc, θdi, θdia, θdib azimuth angle
ω swing angular velocity

The invention claimed is:
1. A work machine comprising:
a work device having a work tool;
a travelling apparatus;
a swing body which is attached to the work device and which is mounted on the travelling apparatus to swing;
a position detection apparatus configured to detect a detected position of the work machine;
an inertial measurement unit attached to the swing body and configured to detect acceleration as one of operation information indicating operation of the swing body;
a position information generation unit configured to operate in three modes:
 (1) when the position detection performed by the position detection apparatus is normal, the position information generation unit operates in a first mode in which position information is the detected position and the position information is output,
 (2) when the position detection performed by the position detection apparatus is abnormal and the work machine is in a static status in which the work machine is not travelling,
  the position information generation unit operates in a second mode in which the position information is generated based on:
   the detected position which is obtained before the position detection apparatus becomes abnormal and which is a cross point of a rotation center axis of the swing body and a surface corresponding to a surface with which the travelling apparatus comes into contact; and
   the operation information, and
  the position information is output, and
 (3) when the position detection performed by the position detection apparatus is abnormal and the work machine is in a non-static status in which the work machine is travelling, the position information generation unit operates in a third mode in which the position information is not output; and
a target value generation unit configured to
 generate a position of the work device based on the position information output from the position information generation unit when the position information generation unit operates in the first mode or the second mode, and
 stop generating the position of the work device when the position information generation unit operates in the third mode,
wherein the target value generation unit is configured to generate the position of the work device by using information of the detected position of the work machine obtained before the position detection performed by the position detection apparatus becomes abnormal and information of a pitch angle based on the acceleration detected by the inertial measurement unit after the position detection performed by the position detection apparatus becomes abnormal, in the second mode.

2. The work machine according to claim 1, wherein the position information generation unit operates in the second or third mode in a case where there is an abnormality in at least one of equipment configured to detect operation of the work machine and equipment configured to obtain the detected position of the work machine during operation in the second mode.

3. The work machine according to claim 1, wherein
the position information generation unit operates in the first mode in a case where the position detection performed by the position detection apparatus becomes normal during operation of the second mode, and
the position information generation unit operates in the third mode when the work machine travels during operation in the second mode, when there is an abnormality in at least one of equipment configured to detect operation of the work machine and equipment configured to obtain the detected position of the work machine during operation in the second mode, when a time of operation in the second mode is more than a threshold value, or when the swing body swings an angle larger than a particular angle in a same direction during operation in the second mode.

4. The work machine according to claim 3, wherein in a case where the position detection performed by the position detection apparatus becomes normal during operation in the second mode and the swing body is swinging, the position information generation unit continues operation in the second mode until swinging of the swing body is finished.

5. The work machine according to claim 1, wherein the position information generation unit operates in the second or third mode on condition that there is an abnormality in at least one of the equipment configured to detect operation of the work machine and the equipment configured to obtain the detected position of the work machine during operation in the second mode.

6. A work machine comprising:
a travelling apparatus;
a work device having a work tool;
a swing body which is attached to the work device and which is mounted on the travelling apparatus to swing;
a position detection apparatus configured to detect a detected position of the work machine;
an inertial measurement unit attached to the swing body and configured to detect acceleration as one of operation information indicating operation of the swing body;
a position information generation unit configured to operate upon selecting from three modes, by using information of whether a position detection performed by the position detection apparatus is normal or abnormal and information of whether the swing body is swinging or not swinging, wherein the three modes include
a first mode in which position information is the detected position and the position information is output,
a second mode in which the position information is generated based on the detected position which is obtained before the position detection apparatus becomes abnormal and which is a cross point of a rotation center axis of the swing body and a surface corresponding to a surface with which the travelling apparatus comes into contact and the operation information, and the position information is output, and
a third mode in which the position information is not output; and
a target value generation unit configured to
generate a position of the work device based on the position information output from the position information generation unit when the position information generation unit operates in the first mode or the second mode, and
stop generating the position of the work device when the position information generation unit operates in the third mode, wherein
the position information generation unit is configured to
operate in the first mode when the position detection performed by the position detection apparatus is normal, and
operate in the second or third mode when the position detection performed by the position detection apparatus is abnormal, and
the target value generation unit is configured to generate the position of the work device by using information of the detected position of the work machine obtained before the position detection performed by the position detection apparatus becomes abnormal and information of a pitch angle based on the acceleration detected by the inertial measurement unit after the position detection performed by the position detection apparatus becomes abnormal, in the second mode.

7. The work machine according to claim 6, wherein in a case where the work machine is in a static status in which the work machine is not travelling and the position detection performed by the position detection apparatus is normal, the position information generation unit operates in the first mode, and obtains the cross point, and
when the work machine transitions into the static status and the position detection performed by the position detection apparatus becomes abnormal, the position information generation unit operates in the second mode by using the cross point.

8. A work machine comprising:
a work device having a work tool;
a travelling apparatus;
a swing body which is attached to the work device and which is mounted on the travelling apparatus to swing;
a position detection apparatus configured to detect a detected position of the work machine;
an inertial measurement unit attached to the swing body and configured to detect acceleration as one of operation information indicating operation of the swing body;
a position information generation unit configured to generate position information based on the detected position which is obtained before the position detection apparatus becomes abnormal and which is a cross point of a rotation center axis of the swing body and a surface corresponding to a surface with which the travelling apparatus comes into contact and the operation information including a pitch angle based on the acceleration detected by the inertial measurement unit after position detection performed by the position detection apparatus becomes abnormal, and output the position information, when the position detection performed by the position detection apparatus is abnormal and the work machine is in a static status in which the work machine is not travelling; and
a target value generation unit configured to generate a position of the work device based on the position information output from the position information generation unit.

9. The work machine according to claim 8, wherein the position information generation unit is configured to not output the position information when the position detection performed by the position detection apparatus is abnormal; the work machine is in the static status; and there is an abnormality in at least one of equipment configured to detect operation of the work machine and equipment configured to obtain the position of the work machine.

10. The work machine according to claim 8, wherein the position information generation unit is configured to output information about the detected position detected by the position detection apparatus as the position information related to the position of the work machine in a case where the position detection performed by the position detection apparatus becomes normal.

11. The work machine according to claim 8, wherein the position information generation unit is configured to stop outputting the position information on condition that a time of operation in which the position information is generated based on the operation information and the cross point is more than a threshold value.

12. The work machine according to claim 8, wherein the position information generation unit is configured to stop outputting the position information of the work machine on condition that the swing body swings an angle larger than a particular angle in a same direction when the position information is generated based on the operation information and the cross point.

13. The work machine according to claim 8, wherein the position information generation unit determines a non-static status that is different from the static status in a case where an operation device configured to operate the swing body is ON or in a case where an operation device configured to operate the travelling apparatus is ON or in a case where a status continues for a first period of time in which a speed at which the swing body swings is equal to or more than a threshold value, and the position information generation unit determines the static status in a case where the operation device configured to operate the swing body is OFF or in a case where the operation device configured to operate the travelling apparatus is OFF or in a case where a status continues for a second period of time in which a speed at which the swing body swings is less than a threshold value.

\* \* \* \* \*